(12) United States Patent
Tabuchi

(10) Patent No.: US 10,720,067 B2
(45) Date of Patent: Jul. 21, 2020

(54) UNMANNED FLIGHT VEHICLE HAVING ROTOR, MOTOR ROTATING THE ROTOR AND CONTROL DEVICE

(71) Applicant: KDDI CORPORATION, Tokyo (JP)

(72) Inventor: Junichi Tabuchi, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/396,216

(22) Filed: Apr. 26, 2019

(65) Prior Publication Data

US 2019/0272761 A1    Sep. 5, 2019

Related U.S. Application Data

(63) Continuation of application No. 15/756,276, filed as application No. PCT/JP2016/088947 on Dec. 27, 2016, now Pat. No. 10,319,245.

(30) Foreign Application Priority Data

Dec. 28, 2015  (JP) .................................. 2015-257098

(51) Int. Cl.
    *G08G 5/00* (2006.01)
    *B64C 39/02* (2006.01)
    (Continued)

(52) U.S. Cl.
    CPC ........... *G08G 5/006* (2013.01); *B60W 50/082* (2013.01); *B64C 39/02* (2013.01); *B64C 39/024* (2013.01);
    (Continued)

(58) Field of Classification Search
    CPC .... G08G 5/006; G08G 5/0021; G08G 5/0026; G08G 5/0034; G08G 5/0039;
    (Continued)

(56) References Cited

U.S. PATENT DOCUMENTS 6,377,875 B1  4/2002 Schwaerzler
7,158,877 B2  1/2007 Carlsson et al.
(Continued)

FOREIGN PATENT DOCUMENTS

CN    1240562 A    1/2000
CN    101192064 A   6/2008
(Continued)

OTHER PUBLICATIONS

International Search Report in International Patent Application No. PCT/JP2016/088947 dated Apr. 11, 2017.
(Continued)

*Primary Examiner* — Marthe Y Marc-Coleman
(74) *Attorney, Agent, or Firm* — Greenblum & Bernstein, P.L.C.

(57) ABSTRACT

An unmanned flight vehicle includes a rotor, a motor rotating the rotor, and a control device controlling the motor and the vehicle. The control device has a memory storing identification information enabling identification of a user of a communication service for receiving first control information or airspace information about an airspace in which the flight vehicle flies via a wireless base station by the unmanned flight vehicle. The control device also has a processor controlling the vehicle to communicate with the wireless base station based on the stored identification information. The processor controls i) a flight state of the vehicle based on the first control information or the airspace information received via the wireless base station by using the identification information, and ii) the vehicle based on a quality of a radio wave that the vehicle has received from the wireless base station.

26 Claims, 9 Drawing Sheets

(51) Int. Cl.
  *G05D 1/00* (2006.01)
  *G05D 1/10* (2006.01)
  *B60W 50/08* (2020.01)

(52) U.S. Cl.
  CPC .......... *G05D 1/0011* (2013.01); *G05D 1/101* (2013.01); *G08G 5/00* (2013.01); *G08G 5/0021* (2013.01); *G08G 5/0026* (2013.01); *G08G 5/0034* (2013.01); *G08G 5/0039* (2013.01); *G08G 5/0069* (2013.01); *B64C 2201/141* (2013.01)

(58) Field of Classification Search
  CPC . G08G 5/0069; G60W 50/082; B64C 39/034; B64C 2201/141; G05D 1/0011; G05D 1/101
  USPC .............................................................. 701/3
  See application file for complete search history.

(56) References Cited

U.S. PATENT DOCUMENTS

| | | | |
|---|---|---|---|
| 9,412,278 | B1 | 8/2016 | Gong et al. |
| 9,536,216 | B1 | 1/2017 | Lisso |
| 10,039,114 | B2 | 7/2018 | Tan |
| 2006/0106506 | A1 | 5/2006 | Nichols et al. |
| 2010/0100269 | A1 | 4/2010 | Ekhaguere et al. |
| 2011/0163908 | A1* | 7/2011 | Andersson ............ G01S 5/0072 342/36 |
| 2011/0257813 | A1 | 10/2011 | Coulmeau et al. |
| 2012/0116614 | A1 | 5/2012 | Torres et al. |
| 2014/0018979 | A1 | 1/2014 | Goossen et al. |
| 2014/0032034 | A1 | 1/2014 | Raptopoulos et al. |
| 2015/0254988 | A1 | 9/2015 | Wang et al. |
| 2015/0348424 | A1 | 12/2015 | Duffy et al. |
| 2018/0253092 | A1 | 9/2018 | Trapero Esteban et al. |

FOREIGN PATENT DOCUMENTS

| | | |
|---|---|---|
| CN | 101593437 A | 12/2009 |
| CN | 102428607 A | 4/2012 |
| CN | 103135106 A | 6/2013 |
| CN | 104166355 A | 11/2014 |
| CN | 104224062 A | 12/2014 |
| CN | 104834307 A | 8/2015 |
| CN | 104881023 A | 9/2015 |
| CN | 104932525 A | 9/2015 |
| CN | 105046835 A | 11/2015 |
| CN | 105162219 A | 12/2015 |
| EP | 0999485 A2 | 5/2000 |
| EP | 2474812 A2 | 7/2012 |
| EP | 2685336 A1 | 1/2014 |
| EP | 2749984 A3 | 6/2015 |
| EP | 3349085 A1 | 7/2018 |
| GB | 2379035 B | 11/2003 |
| JP | 11-345400 A | 12/1999 |
| JP | 2001-110000 A | 4/2001 |
| JP | 2003-127994 A | 5/2003 |
| JP | 2003-127997 A | 5/2003 |
| JP | 2004-192017 A | 7/2004 |
| JP | 2006-082774 A | 3/2006 |
| JP | 2006-082775 A | 3/2006 |
| JP | 2006-143193 A | 6/2006 |
| JP | 2006-213302 A | 8/2006 |
| JP | 2007-237873 A | 9/2007 |
| JP | 2009-211361 A | 9/2009 |
| JP | 2009-251729 A | 10/2009 |
| JP | 2009-540685 A | 11/2009 |
| JP | 2014-031118 A | 2/2014 |
| JP | 2014-40231 A | 3/2014 |
| JP | 2015-113100 A | 6/2015 |

OTHER PUBLICATIONS

Jul. 29, 2019 extended European Search Report in European Application No. 16881781.5.
Sep. 18, 2018 Office Action in U.S. Appl. No. 15/756,276.
May 12, 2020 Japanese Office Action in corresponding Japanese Application No. 2019-072256 and English translation thereof.
Apr. 23, 2020 Chinese Office Action in corresponding Chinese Application No. 201680050963.X and English translation thereof.
Yan Ping; Chen Ying; Chen Xi, Computer Measurement & Control Issue 07, "Design and implementation of UAV flight safety control system", Jul. 31, 2007, pp. 902-904 and English Abstract thereof.

* cited by examiner

| FLIGHT VEHICLE MANAGEMENT NUMBER | MODEL INFORMATION | CLASSIFICATION INFORMATION | USER IDENTIFICATION INFORMATION | FIRST IDENTIFICATION INFORMATION | SECOND IDENTIFICATION INFORMATION |
|---|---|---|---|---|---|
| DR01 | xxxx | SMALL DRONE (FOUR ROTORS) | USER TERMINAL IMSI | IMEI01 | IMSI01 |
| DR02 | xxxx | LARGE DRONE (EIGHT ROTORS) | USER TERMINAL IMSI | IMEI02 | IMSI02 |

| PLAN NUMBER | DATE INFORMATION | AIRSPACE INFORMATION ||||| USER IDENTIFICATION INFORMATION |
| | | POSITION INFORMATION | ALTITUDE INFORMATION | BASE STATION IDENTIFICATION INFORMATION | AIRSPACE DETERMINATION INFORMATION | |
|---|---|---|---|---|---|---|
| U1 | START TIME T1 TO END TIME T2 | LATITUDE/ LONGITUDE RANGE | 0~H1 | BS001 | ZA | USER TERMINAL ID01 |
| U2 | ... | ... | ... | BS002 | ZC | USER TERMINAL ID01 |
| ... | ... | ... | ... | ... | ... | ... |
| M1 | ALL TIMES | FROM PRESENT POSITION TO DESIGNATED LANDING POINT | ALTITUDE RANGE A | ALL BASE STATIONS | ... | ... |
| M2 | ALL TIMES | PRESENT POSITION | DESIGNATED ALTITUDE RANGE | ALL BASE STATIONS | ... | ... |
| M3 | ALL TIMES | VICINITY OF xx AIRPORT | ... | BS011... | ZZ | ... |
| ... | ... | ... | ... | ... | ... | ... |

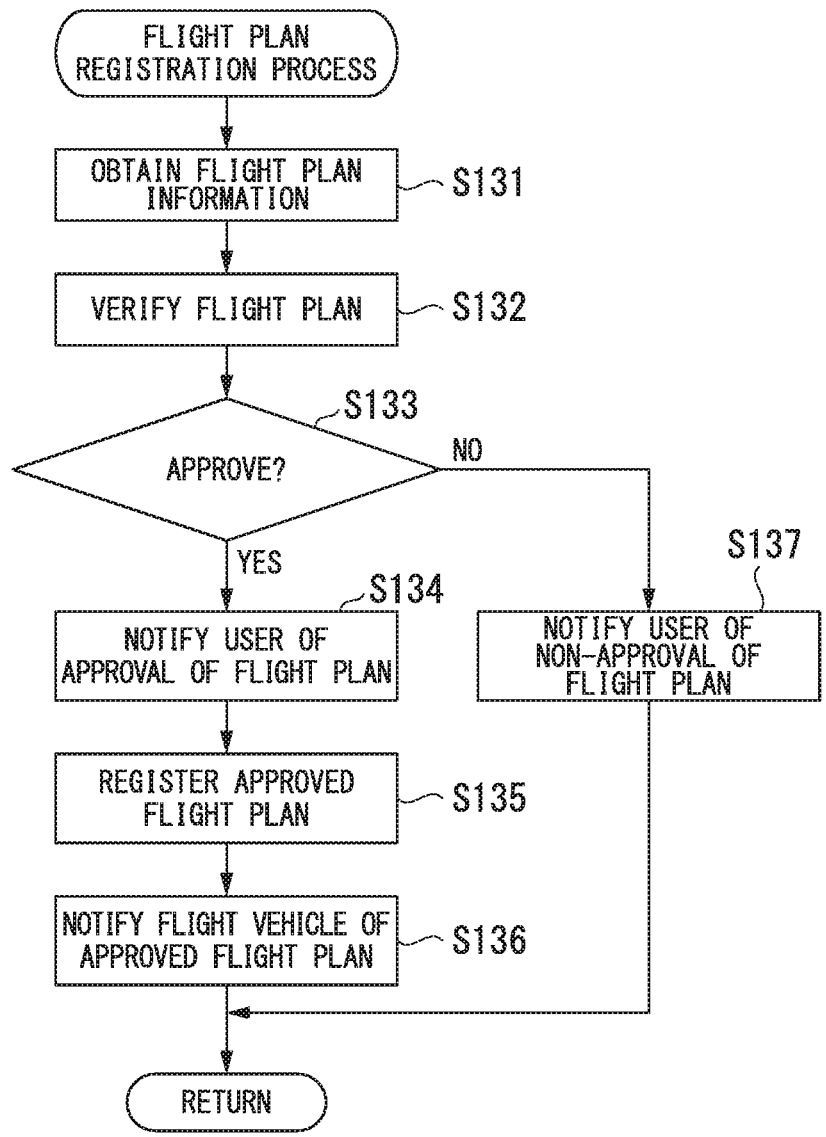

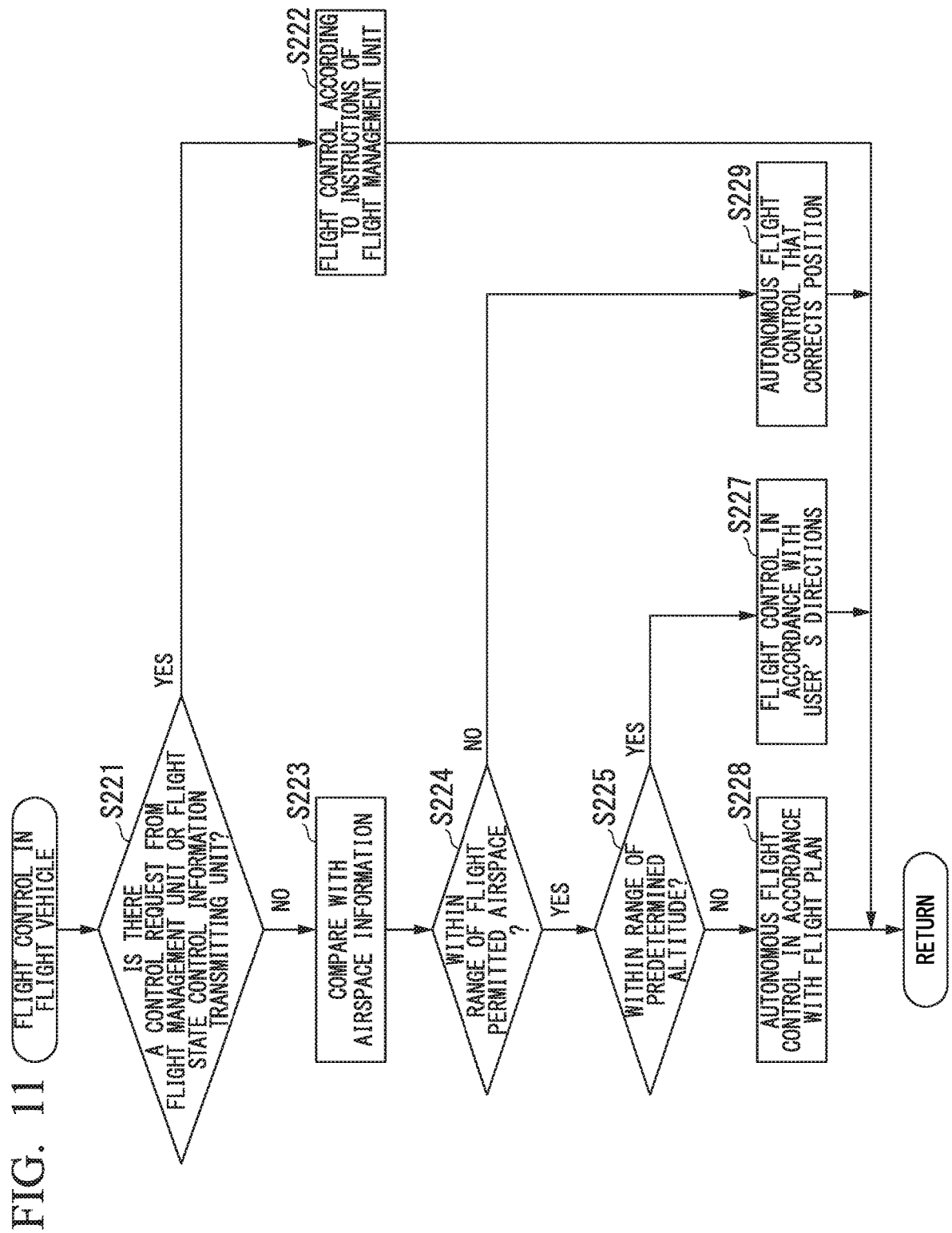

UNMANNED FLIGHT VEHICLE HAVING ROTOR, MOTOR ROTATING THE ROTOR AND CONTROL DEVICE

CROSS-REFERENCE TO RELATED APPLICATIONS

This application is a continuation of U.S. application Ser. No. 15/756,276, filed Feb. 28, 2018, pending, which is a § 371 national stage entry of International Patent Application No. PCT/JP2016/088947, filed Dec. 27, 2016, which claims the foreign priority benefit of Japanese Patent Application No. 2015-257098, filed Dec. 28, 2015. The entire disclosure of each of the above-identified three applications, including the specification, drawings, and claims, is incorporated herein by reference in its entirety.

TECHNICAL FIELD

The embodiment of the present invention relates to a flight vehicle control device, a flight permitted airspace setting system, and a flight vehicle control method and program.

BACKGROUND ART

A flight vehicle control device receives remote control for the flying of a local flight vehicle that is an unmanned aircraft by communication via a wireless communication line. When such a flight vehicle cannot stably receive radio waves of the radio communication line, control of the flight vehicle may no longer be possible. On the other hand, a technique is known for controlling the flight of an aircraft that is taking off or landing using an airstrip.

[Patent Document 1] Japanese Unexamined Patent Application, First Publication No. H11-345400.

SUMMARY OF INVENTION

Problem to be Solved by the Invention

However, the technique disclosed in Patent Document 1 requires dedicated radio equipment for controlling an aircraft. It is difficult to install such dedicated radio equipment at a location for flying flight vehicles that are unmanned aircraft.

The object of the present invention is to provide a flight vehicle control device, a flight permitted airspace setting system, and a flight vehicle control method and program that raise reliability when controlling the flight of a flight vehicle with a simpler constitution.

Means for Solving the Problem

A flight vehicle control device according to an aspect of the present invention includes: an identification information storage unit in which identification information for identifying a flight vehicle or a user of the flight vehicle is stored; a wireless communication unit that receives, through a wireless base station, airspace information about an airspace in which the flight vehicle flies, based on the stored identification information; an own vehicle position measuring unit that measures a position of the flight vehicle; and a flight state control unit that controls a flight state of the flight vehicle based on the received airspace information and the measured position of the flight vehicle.

In the above-mentioned flight vehicle control device, the airspace information may indicate a flight permitted airspace that is an airspace in which flight of the flight vehicle is permitted or a flight not permitted airspace that is airspace in which flight of the flight vehicle is not permitted.

In the above-mentioned flight vehicle control device, the flight state control unit, based on the measured position of the flight vehicle, may switch between: a wireless control mode in which the flight state of the flight vehicle is controlled based on control information that the wireless communication unit receives through the wireless base station; and an autonomous control mode in which the flight state of the flight vehicle is controlled based on control information stored in advance in the flight vehicle.

In the above-mentioned flight vehicle control device, the flight state control unit may set a mode of the flight vehicle to the autonomous control mode in a case where a radio wave intensity that the wireless communication unit has received from the wireless base station is less than a predetermined value.

A flight permitted airspace setting system according to an aspect of the present invention includes: the above-mentioned flight vehicle control device; and a flight permitted airspace setting device. The flight permitted airspace setting device includes: a model information storage unit that stores flight vehicle model information indicating a model of the flight vehicle; a flight airspace information storage unit in which the identification information and the airspace information are stored in association with each other; a flight airspace setting unit that sets the airspace information based on the flight vehicle model information and writes the set airspace information to the flight airspace information storage unit; and a communication unit that transmits the written airspace information to the flight vehicle control device through the wireless base station.

In the above-mentioned flight permitted airspace setting system, the flight permitted airspace setting device may further include: a transmitting unit that transmits, to the flight state control unit, flight state control information for controlling the flight state of the flight vehicle, based on the position at which the flight vehicle is flying and the written airspace information.

In the above-mentioned flight permitted airspace setting system, the permitted airspace setting device may further include: a flight vehicle pilot management unit that identifies the user of the flight vehicle.

In the above-mentioned flight permitted airspace setting system, the identification information may include identification information that enables identification of a user of a communication service for sending control information to the flight vehicle.

In the above-mentioned flight permitted airspace setting system, the flight airspace setting unit, based on a place of departure and destination of the flight vehicle, may calculate estimated time of the flight vehicle arriving at the destination.

In the above-mentioned flight permitted airspace setting system, the flight airspace setting unit, based on of a place of departure and destination of the flight vehicle and a battery charge level of the flight vehicle, may determine whether the flight vehicle can reach the destination.

A flight permitted airspace setting system according to an aspect of the present invention includes: the above-mentioned flight vehicle control device; and a flight permitted airspace setting device. The flight permitted airspace setting device includes: a model information storage unit that stores flight vehicle model information indicating a model of the flight vehicle; a flight airspace information storage unit in which the identification information and the airspace information are stored in association with each other; a flight airspace setting unit that sets the airspace information based on the flight vehicle model information and writes the set airspace information to the flight airspace information storage unit; and a communication unit that transmits the written airspace information to the flight vehicle control device through the wireless base station. The flight airspace setting unit sets a mode of the flight vehicle to a wireless control mode in which a flight state of the flight vehicle is controlled based on control information that the wireless communication unit receives through the wireless base station, a case where the flight vehicle has approached, by a predetermined distance or more, airspace in which the flight vehicle is prohibited from flying.

A flight vehicle control method according to an aspect of the present invention includes: receiving, through a wireless base station, airspace information about an airspace in which a flight vehicle flies, based on identification information for identifying the flight vehicle or a user of the flight vehicle; measuring a position of the flight vehicle; and controlling a flight state of the flight vehicle based on the received airspace information and the measured position of the flight vehicle.

A program according to an aspect of the present invention causes a computer mounted in a flight vehicle to execute: receiving, through a wireless base station, airspace information about an airspace in which the flight vehicle flies, based on identification information for identifying the flight vehicle or a user of the flight vehicle; measuring a position of the flight vehicle; and controlling a flight state of the flight vehicle based on the received airspace information and the measured position of the flight vehicle.

Effect of the Invention

According to the present invention, it is possible to provide a flight vehicle control device, a flight permitted airspace setting system, and a flight vehicle control method and program that raise reliability when controlling the flight of a flight vehicle with a simpler constitution.

BRIEF DESCRIPTION OF THE DRAWINGS

FIG. 6 is a diagram that shows an example of flight vehicle type information stored in the flight vehicle type information storage unit in the first embodiment.

FIG. 7 is a diagram that shows an example of flight vehicle type information stored in the flight airspace information storage unit in the first embodiment.

FIG. 8 is a flowchart that shows the procedure of the flight plan registration process of the first embodiment.

FIG. 11 is a flowchart that shows the procedure of flight control in a flight vehicle of the first embodiment.

EMBODIMENTS FOR CARRYING OUT THE INVENTION

Hereinbelow, a flight vehicle control device, a flight permitted airspace setting system, and a flight vehicle control method and program will be described with reference to the drawings.

First Embodiment

Figure 1:
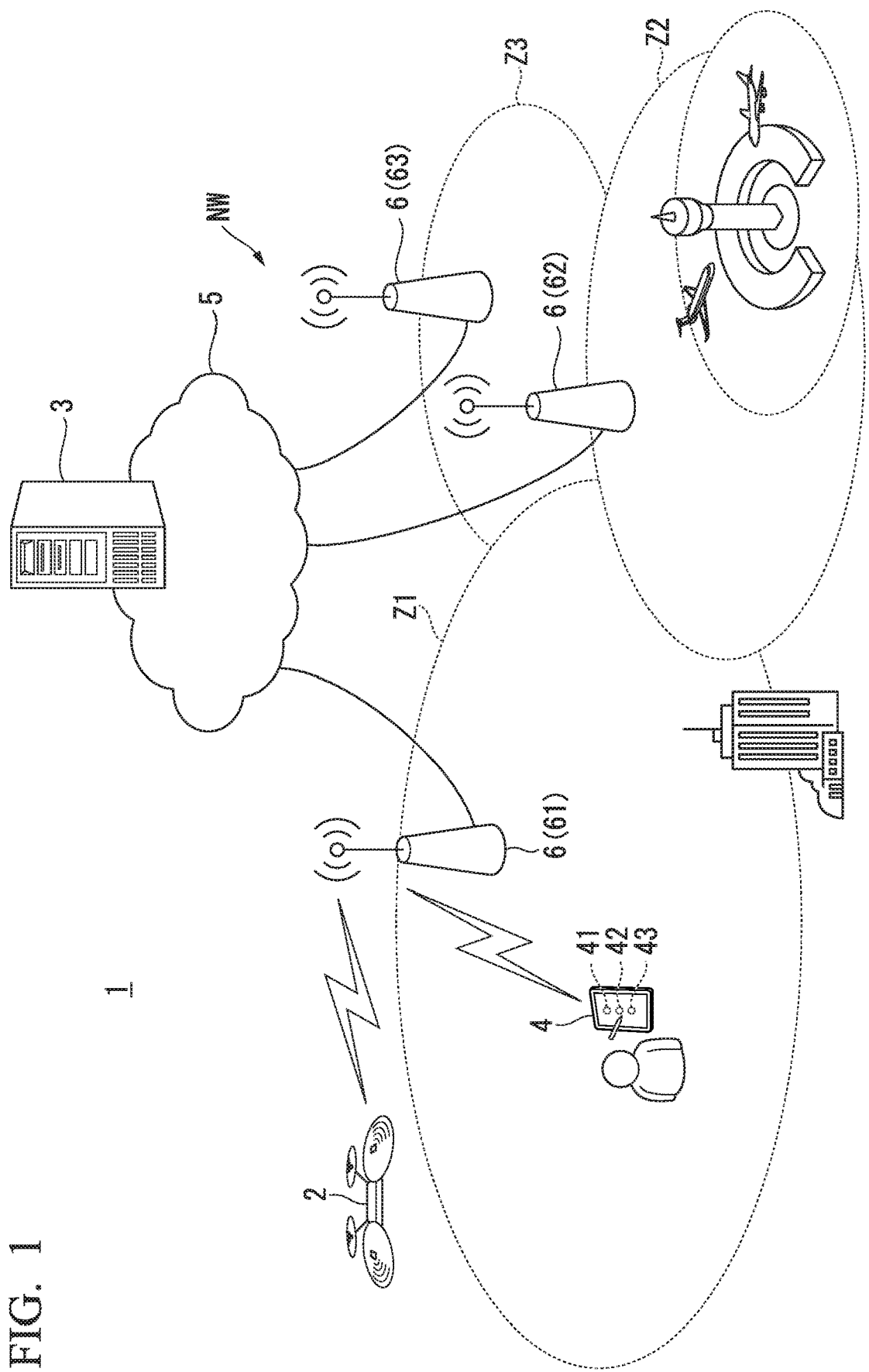
FIG. 1 is a lineblock diagram that shows the flight permitted airspace setting system according to the first embodiment.

FIG. 1 is a lineblock diagram showing the flight permitted airspace setting system 1 according to the first embodiment. The flight permitted airspace setting system 1 includes a flight vehicle 2, a flight permitted airspace setting device 3, a user terminal 4, a communication network 5, and a wireless base station 6.

Figure 2:
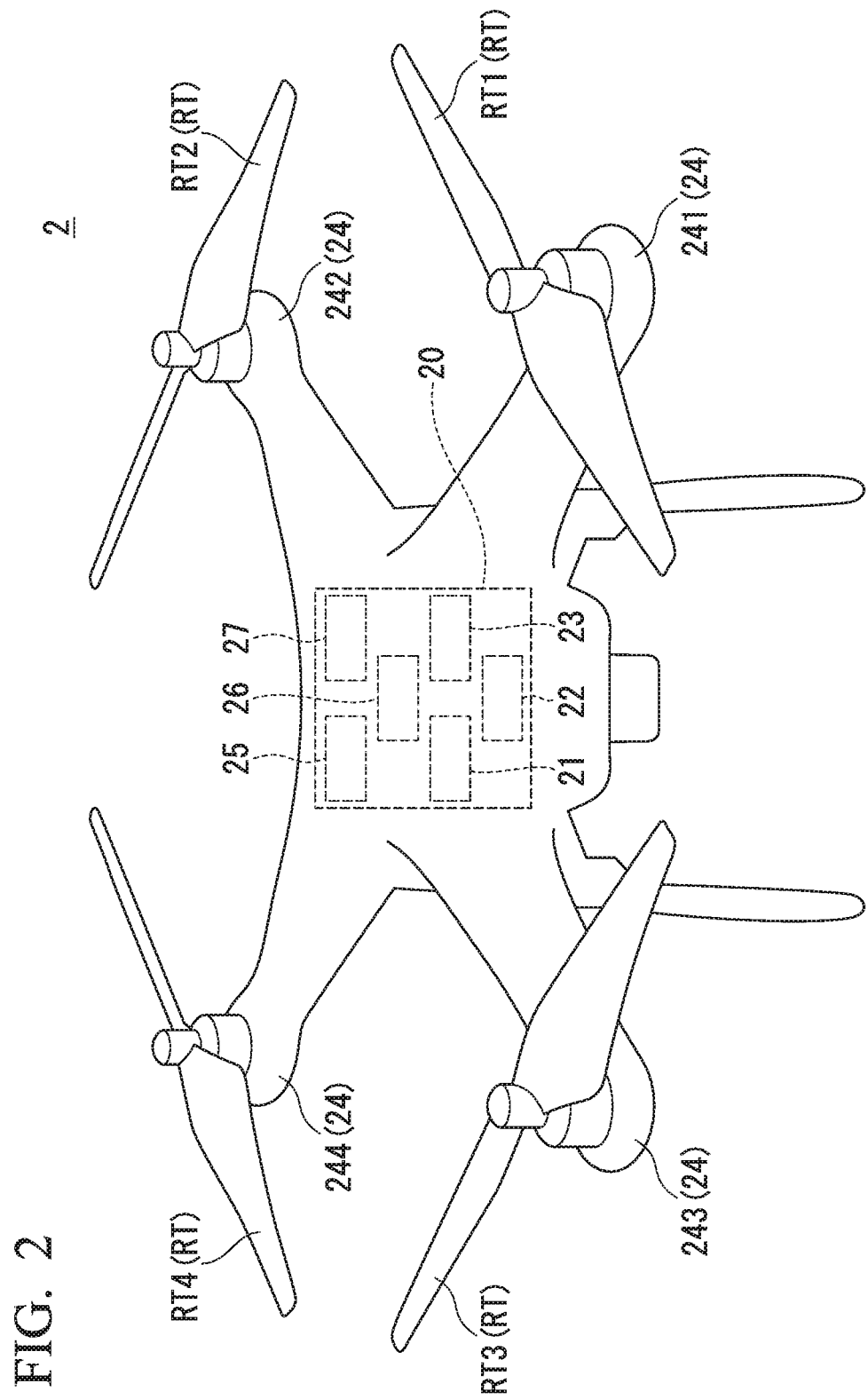
FIG. 2 is a diagram showing an example of the outer constitution of a flight vehicle according to the first embodiment.

The flight vehicle 2 is an unmanned aircraft as shown in FIG. 2 described below. The flight permitted airspace setting device 3 sets the airspace where the flight vehicle 2 flies, and transmits airspace information indicating the set airspace to the flight vehicle 2 to cause the flight vehicle 2 to fly in accordance with the airspace information. The user terminal 4 is a computer device such as a smartphone that receives operations of a user who is flying the flight vehicle 2.

The user terminal 4 receives an operation of the user of the flight vehicle 2, transmits the received operation to the flight permitted airspace setting device 3, and has the flight permitted airspace setting device 3 set the airspace for flying the flight vehicle 2. Moreover, the user terminal 4 receives an operation of the user of the flight vehicle 2, transmits the received operation to the flight permitted airspace setting device 3, and controls the flight of the flight vehicle 2 through the flight permitted airspace setting device 3.

The user terminal 4 may display a map in which a guide route of the flight vehicle 2 is shown using three-dimensional (3D) map information (three-dimensional data showing the ground surface) and the flight path of the flight vehicle 2. The three-dimensional map information may also include structures such as buildings and topography such as mountains. The user terminal 4 may also display an image in which the guide route of the flight vehicle 2 is indicated using ages captured by the flight vehicle 2 and the flight path of the flight vehicle 2. The flight route displayed on a map or an image may include arrows or colored lines for guiding the direction of movement. The display screen of the user terminal 4 may display side by side the current battery charge level of the flight vehicle 2 and the electric power required for moving to the destination.

The communication network 5 relays communication between the flight vehicle 2, the flight permitted airspace setting device 3, and the user terminal 4. The wireless base station 6 is a base station for wireless communication and is connected to the communication network 5 by a connection line. The communication network 5 and the wireless base station 6 form a network NW that provides communication services such as voice communication and data communication to terminal equipment such as a smartphone. In the network NW, communication procedures are converted between the wireless base station 6 side and the communication network 5 side by a gateway provided on the communication network 5 side.

The range (cell) in which communication is possible is set for each wireless base station 6. In the example shown in FIG. 1, the cells Z1 to Z3 (hereinbelow generally called cell Z) are respectively set for the wireless base stations 61 to 63. For example, terminal devices such as the flight vehicle 2 and the user terminal 4 located in the cell Z1 detect the wireless base station 61, and a management device, not illustrated, in the network NW manages that information. The flight vehicle 2 and user terminal 4 are examples of terminal devices that communicate wirelessly using the network NW.

The flight permitted airspace setting system 1 manages the airspace where the flight vehicle 2 flies in units of cell Z. Airspace in the embodiment refers to a region for flying the flight vehicle 2, and for example the range thereof is defined by latitude/longitude information and altitude information. Each airspace is divided into a region in which flying of the flight vehicle 2 is possible (flight possible region) or a region in which flying of the flight vehicle 2 is prohibited (flight prohibited region) depending on various conditions. The setting conditions of airspace may differ depending various conditions such as the flight vehicle 2, the user (operator), the surrounding area, the scheduled time of flight, and the like. The flight vehicle 2 is required to fly in a range that satisfies the flight conditions.

The flight permitted airspace setting device 3 statistically stores the position and altitude that a flight vehicle 3 has flown, and may set a flight possible airspace based on that information. A prohibited area may be excluded from a flight possible airspace. A prohibited zone may be a zone in which the weather is bad or a zone in which base station hindrances occur. A prohibited zone may be a zone that the state or administration has set as a prohibited zone. A prohibited zone may be a zone in which other flight vehicles are flying at the same time as the time at which the flight vehicle 3 is flying. A prohibited zone may be a zone (region) that is crowded with flight vehicles. A prohibited zone may be a zone through which numerous flight vehicles pass at a specified time. The flight permitted airspace setting device 3 may set a flight route avoiding a prohibited zone. A flight possible airspace may be set depending on the specifications of the flight vehicle 3 and the user. The airspace may also contain a three-dimensional map. The airspace (airspace information) may be set on the basis of the relation with structures and the like (three-dimensional map).

The flight permitted airspace setting system 1 supports flight of the user's flight vehicle 2 by managing regions in which the restrictions on flight conditions differ as mentioned above and performing control so that the flight vehicle 2 does not enter flight not permitted airspace and flight prohibited airspace.

When the flight vehicle 2 has approached a flight not-permitted airspace or flight prohibited airspace by a predetermined distance or more, the flight permitted airspace setting system 1 (flight permitted airspace setting device 3) may notify the user terminal 4 accordingly (with an alarm). When the flight vehicle 2 has exceeded a speed limit, the flight permitted airspace setting system 1 (flight permitted airspace setting device 3) may control the speed of the flight vehicle 2 to become lower than the speed limit. When the flight vehicle 2 has approached the speed limit, the flight permitted airspace setting system 1 (flight permitted airspace setting device 3) may notify the user terminal 4 accordingly (with an alarm).

FIG. 2 is a diagram showing an example of the outer constitution of the flight vehicle 2 according to the present embodiment. The flight vehicle control device 20 is in this example mounted on the flight vehicle 2 shown in FIG. 2. This flight vehicle 2 includes the flight vehicle control device 20 and a motor 24.

The motor 24 provides lift and propulsion to the flight vehicle 2 by rotating a rotor RT. In this example, the flight vehicle 2 includes motors 241 to 244. The motors 241 to 244 rotate corresponding rotors RT1 to RT4. The flight vehicle control device 20, by controlling the driving current supplied to each motor 24, can control the flight altitude, orientation and travel direction of the flight vehicle 2.

Figure 3:
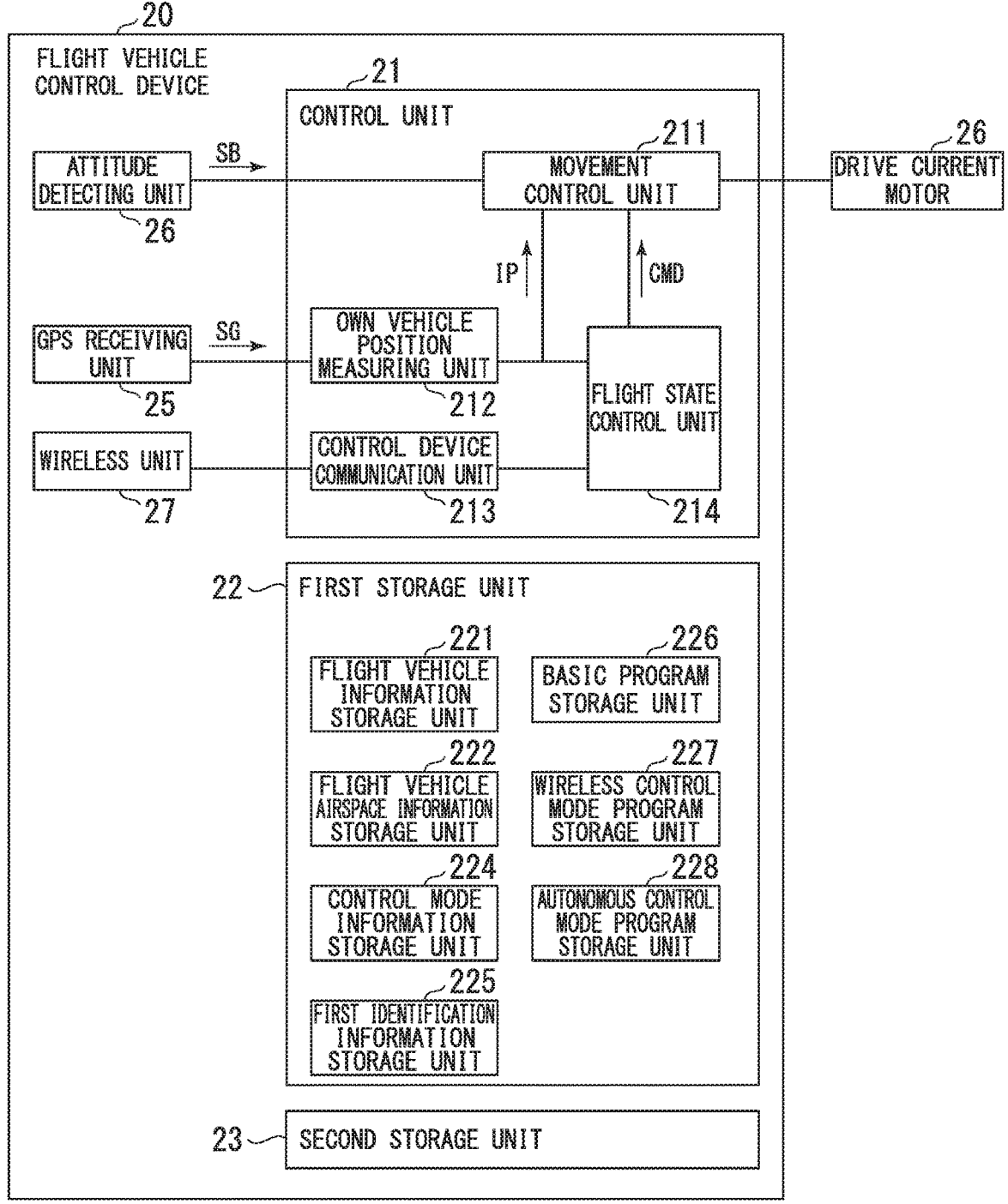
FIG. 3 is a block diagram of the flight vehicle control device according to the first embodiment.

FIG. 3 is a block diagram of the flight vehicle control device 20 according to the present embodiment. The flight vehicle control device 20 includes a control unit 21, a first storage unit 22, a second storage unit 23, a GPS receiving unit 25, an attitude detecting unit 26, and a wireless unit 27.

The GPS receiving unit 25 receives radio waves transmitted by a GPS (Global Positioning System) satellite. A signal for specifying the position where the radio waves are received, that is, the position of the flight vehicle 2, is included in the radio waves transmitted by this GPS satellite. The GPS receiving unit 25 converts the radio waves received from the GPS satellite into a GPS signal SG, and outputs the converted GPS signal SG to the control unit 21. Although this example describes the case of the GPS receiving unit 25 receiving a radio wave transmitted by a GPS satellite, the present invention is not limited thereto. For example, the GPS receiving unit 25 may receive radio waves from satellites other than GPS satellites, such as a quasi-zenith satellite with high positioning accuracy.

The attitude detecting unit 26, which includes an accelerometer and a gyroscope, detects the attitude of the flight vehicle 2 and generates an attitude detection signal SB.

The wireless section 27 includes an antenna, which is not illustrated, and receives a radio wave transmitted by the wireless base station 6. A base station ID, which is information for identifying the wireless base station 6, is contained in the radio wave transmitted by the wireless base station 6. For example, "Z001" is included as a base station ID in the radio waves transmitted by the wireless base station 61. "Z002" and "Z003" are included as the base station ID in the radio waves respectively transmitted by the wireless base station 62 and the wireless base station 63. The wireless section 27 converts the received radio waves into a reception signal SR, and outputs the reception signal SR that has been converted to the control unit 21. The base station ID, which is information for identifying the wireless base station 6, is included in this reception signal SR.

The control unit 21 includes a movement control unit 211, an own vehicle position measuring unit 212, a control device communication unit 213 (wireless communication unit), and a flight state control unit 214.

The first storage unit 22 and the second storage unit 23 are realized by ROM (Read Only Memory), RAM (Random Access Memory), HDD (Hard Disk Drive), a flash memory, and the like. The program executed by a processor may be stored in advance in the first storage unit 22, or may be downloaded from an external device, a portable storage medium or via a communication line.

The first storage unit 22 contains a flight vehicle information storage unit 221, a flight vehicle airspace information storage unit 222, a control mode information storage unit 224, a first identification information storage unit 225, a basic program storage unit 226, a wireless control mode program storage unit 227, and an autonomous control mode program storage unit 228. The basic program storage unit 226 stores programs for performing processes of the flight vehicle 2 such as a communication process, a state management process, and a process required for maintaining flight. The wireless control mode program storage unit 227 stores a program for performing control commands received by wireless communication. The autonomous control mode program storage unit 228 stores a program for the flight vehicle 2 to fly by auto pilot. The control mode information storage unit 224 stores flag information showing the result of the control unit 21 having determined the aforementioned control mode. The first identification information storage unit 225 stores information that includes first identification information. The first identification information is identification information that enables identification of the flight vehicle 2. The flight vehicle information storage unit 221 and the flight vehicle airspace information storage unit 222 are described in detail below.

The second storage unit 23 stores information that enables identification of the user using the communication service. Information for identifying the user using the communication service may include for example a country code, an identification number of the communication provider providing the wireless communication service, an identification number assigned to the user from the aforementioned communication provider, and may form the first identification information on the basis of at least some of those information or a combination of some of the information. The information stored in the second storage unit 23 may be used as identification information which identifies the user of the flight vehicle 2.

The first storage unit 22 and the second storage unit 23 may be affixed to a circuit substrate not illustrated, or may be detachably mounted to a housing unit (not illustrated) that is provided on the circuit substrate. Reading and writing of data to/from the first storage unit 22 and the second storage unit 23 is performed by the control unit 21.

The own vehicle position measuring unit 212 of the control unit 21 obtains the GPS signal SG from the GPS receiving unit 25, measures the own vehicle position, and generates own vehicle position information IP.

The control device communication unit 213 performs communication with the wireless base station 6 on the basis of the identification information stored in either the first identification information storage unit 225 or the second storage unit 23 via the wireless unit 27.

Based on the own vehicle position information IP generated by the own vehicle position measuring unit 212 and information acquired via the wireless unit 27 and the control device communication unit 213, the flight state control unit 214 generates a flight control command CMD to control the flight state of the flight vehicle 2. For example, the flight state control unit 214 receives information, such as airspace information showing the flight plan to be flown by the flight vehicle 2, as information obtained through the wireless unit 27 and the control device communication unit 213.

The flight state control unit 214 may receive control from the flight permitted airspace setting device 3 described below, and execute the control mode process selected from a plurality of control modes. For example, the flight state control unit 214 may execute a wireless control mode that controls the flight state of the own flight vehicle 2 on the basis of the control information which the control device communication unit 213 received via the wireless base station 6. The flight state control unit 214 may execute an autonomous control mode that controls the flight state of own flight vehicle 2 on the basis of the control information stored in advance in the first storage unit 22 of own flight vehicle 2. The flight state control unit 214 switches between the wireless control mode and the autonomous control mode on the basis of the position of the own flight vehicle 2 measured by the own vehicle position measuring unit 212 and flies the flight vehicle 2 by a flight control command CMD generated by the switched-to control mode (mode of the flight vehicle 2). For example, during execution of the autonomous control mode, the flight state control unit 214 decides positions to be flown on the basis of the received airspace information, sets a course so as to pass through the decided positions, and causes autonomous flight to be carried out by the auto pilot along the set flight course.

The flight vehicle 2 may successively transmits airframe information and images (circumferential landscape) captured by a camera (not illustrated) provided in the flight vehicle 2 to the user terminal 4. The user terminal 4 may also transmit control information which directs the direction of movement based on that information to the flight vehicle 2. The airframe information may include identification information of the flight vehicle 2, the attitude of the flight vehicle 2 (direction and inclination), battery charge level, and the presence or absence of failure of the rotor RT. In the case of a situation where the flight vehicle 2 cannot transmit images, the mode of the flight vehicle 2 switches to automatic flight mode (autonomous control mode and the flight vehicle 2 may fly automatically to the place (destination) directed by the user terminal 4.

The flight permitted airspace setting device 3 and the like may transmit vicinity information relating to the peripheral positions of the flight vehicle 2 to the user terminal 4. The user may operate the flight vehicle 2 on the basis of the vicinity information using the user terminal 4. The vicinity information may also include the weather such as rain and wind, the denseness degree of other flight vehicles (the existence of other flight vehicles being recognized with a sensor or camera), and information indicating the operation and stoppage of the wireless base station 6.

The flight vehicle 2 may have a collision prediction sensor (not illustrated) by which the flight vehicle 2 detects that a structure exists in a travel direction, or the approach of another flight vehicle or a bird. On the basis of the detection by the collision prediction sensor, the flight vehicle 2 predicts a collision and outputs an alarm signal or gives a warning sound, or autonomously avoids a collision. The operation of the flight vehicle 2 autonomously avoiding a collision may be given priority over an operation based on manipulation of the user terminal 4.

The flight state control unit 214 may set the mode of the flight vehicle 3 to the autonomous control mode when the radio wave quality is bad, for example, when the size of radio waves which the control apparatus communication unit 213 has received from the wireless base station 6 is less than a predetermined value. By information from other flight vehicles, the flight state control unit 214 may obtain as statistical data whether the radio field intensity of a certain location of a certain route is weak, and determine whether or not the radio wave quality is bad on the basis of that statistical data.

Which mode the flight vehicle 2 is in (for example, the radio control mode (user maneuvering mode) or autonomous control mode (automatic operative method mode)) may be displayed in real time by the user terminal 4.

The movement control unit 211 receives own position information IP generated by the own vehicle position measuring unit 212 and attitude detection signal SB generated by attitude detecting unit 26, and adjusts the driving amount of the motor 24 to stabilize the attitude during flight of the flight vehicle 2. The movement control unit 211 receives the flight control command CMD generated by the flight state control unit 214 and flies the flight vehicle 2 by controlling the driving amount of the motor 24 so that the flight vehicle 2 reaches the target position.

Figure 4:
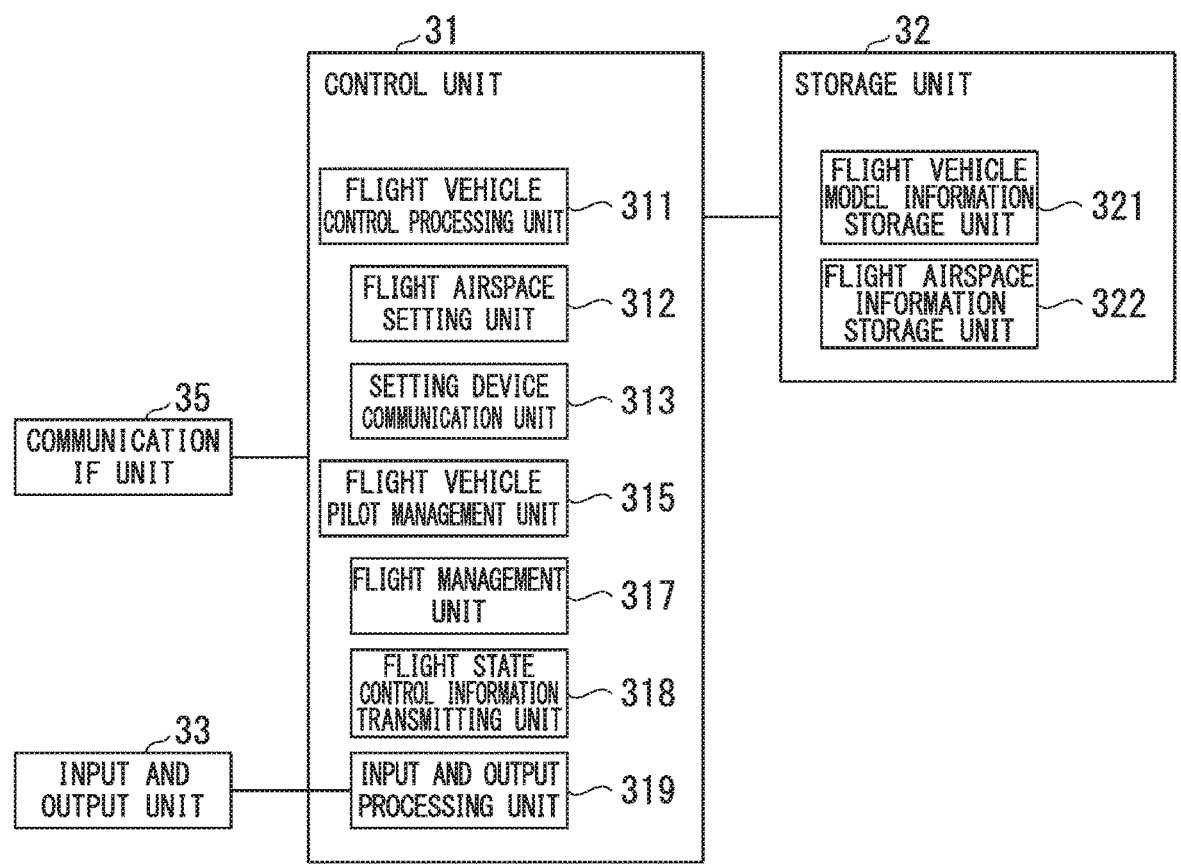
FIG. 4 is a block diagram of the flight permitted airspace setting device according to the first embodiment.

FIG. 4 is a block diagram of the flight permitted airspace setting device 3 according to the present embodiment. The flight permitted airspace setting device 3 includes a control unit 31, a storage unit 32, an input and output section 33, and a communication IF (interface) unit 35.

The storage unit 32 is realized by ROM, RAM, HDD, or flash memory. The program executed by a processor may be stored in advance in the storage unit 32, or may be downloaded from an external device. The program may be installed in the storage unit 32 by a portable storage medium housing the program being mounted in a drive device not illustrated. The storage unit 32 includes a flight vehicle model information storage unit 321 (model information storage unit) and a flight airspace information storage unit 322. The details of each of the above-mentioned units are described below.

An input and output unit 33 includes a display unit, a keyboard and the like not illustrated. The input and output unit 33 receives operations to the flight permitted airspace setting device 3, and notifies an input and output processing unit 319 described below about the operations. The input and output unit 33 displays the control state of the control unit 31 by control from the input and output processing unit 319.

The communication IF unit 35 is an interface which communicates with the flight vehicle 2 and the user terminal 4 through the communication network 5 and the wireless base station 6 by control of the control unit 31.

The control unit 31 includes a flight vehicle control processing unit 311, a flight airspace setting unit 312, a setting device communication unit 313 (communication unit), a flight vehicle pilot management unit 315, a flight management unit 317, a flight state control information transmitting unit 318, and the input and output processing unit 319.

The flight vehicle control processing unit 311 communicates with the user terminal 4 and the flight vehicle 2 through the communication IF unit 35. The flight vehicle control processing unit 311 transmits information such as an operation screen for controlling the flight vehicle 2 to the user terminal 4, and receives from the user terminal 4 operations of the user detected by the user terminal 4. The flight vehicle control processing unit 311 transmits information corresponding to the operations of the user that have been received to the flight vehicle 2 to fly the flight vehicle 2.

The flight airspace setting unit 312 acquires position information provided from the user terminal 4 showing the positions scheduled to be flown by the flight vehicle 2, generates airspace information designating airspace for flying the flight vehicle 2, and writes the airspace information to the flight airspace information storage unit 322. The airspace information includes information showing the flight plan of the flight vehicle 2.

The flight airspace setting unit 312 may acquire the place of departure and destination of the flight vehicle 2 from the user the user terminal 4. The flight airspace setting unit 312 may set a flight path that avoids a flight prohibited region such as an airport on the basis of the place of departure and destination of the flight vehicle 2. The flight airspace setting unit 312 may calculate the time that the flight vehicle 2 is expected to arrive at the destination on the basis of the place of departure and destination of the flight vehicle 2.

The flight airspace setting unit 312 may acquire information indicating the battery charge level of the flight vehicle 2 from the flight vehicle 2. The flight airspace setting unit 312 may judge whether the flight vehicle 2 can reach the destination by the arrival target time on the basis of the place of departure, destination, and battery charge level of the flight vehicle 2. The flight airspace setting unit 312 may set the flight path on the basis of whether the flight vehicle 2 is capable of reaching the destination by the arrival target time and the scheduled time of arrival at the destination.

The flight airspace setting unit 312 may select a plurality of flight paths as a flight path, rank the flight paths in order of precedence, and notify the user terminal 4 of information indicating the flight paths, with each having a priority ranking. The priority ranking may be decided on the basis of the battery charge level and the scheduled time of arrival. The flight airspace setting unit 312 may notify the user terminal 4 of information indicating the plurality of flight paths having a priority ranking. The user may select one of the plurality of flight paths using the user terminal 4. The flight permitted airspace setting device 3 may set the selected flight path as the path of the flight vehicle 2.

When an event affecting the flight of the flight vehicle 2 has occurred, the flight airspace setting unit 312 may set a new flight path. Specific examples of events that effect the flight of the flight vehicle 2 may include weather anomalies during flight of the flight vehicle 2 (windstorm, lightning, thunderstorm and the like), an accident involving the flight vehicle 2, and stoppage of the wireless base station 6. The flight airspace setting unit 312 may notify the user terminal 4 of information indicating that the new flight path has been set. Thereby, the user can learn that a new flight path has been set. When an event affecting the flight of the flight vehicle 2 has occurred, the flight permitted airspace setting device 3 may select a plurality of flight paths as a new flight path, rank the flight paths in order of precedence, and notify the user terminal 4 of information indicating the flight paths, with each having a priority ranking. The user may select one of the plurality of flight paths using the user terminal 4. The flight permitted airspace setting device 3 may set the selected flight path as the new flight path.

Along with the flight path, the flight airspace setting unit 312 may set the expected weather information, the required amount of electrical power to the destination, and a speed limit of the flight vehicle 2. When the flight vehicle 2 has approached, by a predetermined distance or more, airspace in which flight of the flight vehicle 2 is prohibited, the flight airspace setting unit 312 may set the mode of the flight vehicle 2 to a wireless control mode that controls the flight state of the flight vehicle 2 on the basis of control information received via the wireless base station 6.

The setting device communication unit 313 (communication unit) transmits airspace information stored in the flight airspace information storage unit 322 as information indicating the flight plan of the flight vehicle 2 via the communication IF unit 35. When the flight airspace information storage unit 322 stores three-dimensional map information, the airspace information being transmitted may include that three-dimensional map information. The setting device communication unit 313 sends the airspace information to the flight vehicle control device 20 via the wireless base station 6, and causes the flight vehicle 2 to fly in accordance with the airspace information.

The flight vehicle pilot management unit 315 manages the flight vehicle pilot (user) piloting the flight vehicle 2 by operation of the user terminal 4. The flight management unit 317 manages the flight state of the flight vehicle 2. Based on the determination result of the flight state of the flight vehicle 2 by the flight management unit 317, the flight state control information transmitting unit 318 transmits information for controlling the flight to the flight vehicle 2. For example, information that guides the flight of the flight vehicle 2 to a safe state is included in the information transmitted by the flight state control information transmitting unit 318 to the flight vehicle 2. The input and output processing unit 319 receives various operations to the flight permitted airspace setting device 3, and displays operation screens relating to those operations.

Figure 5:
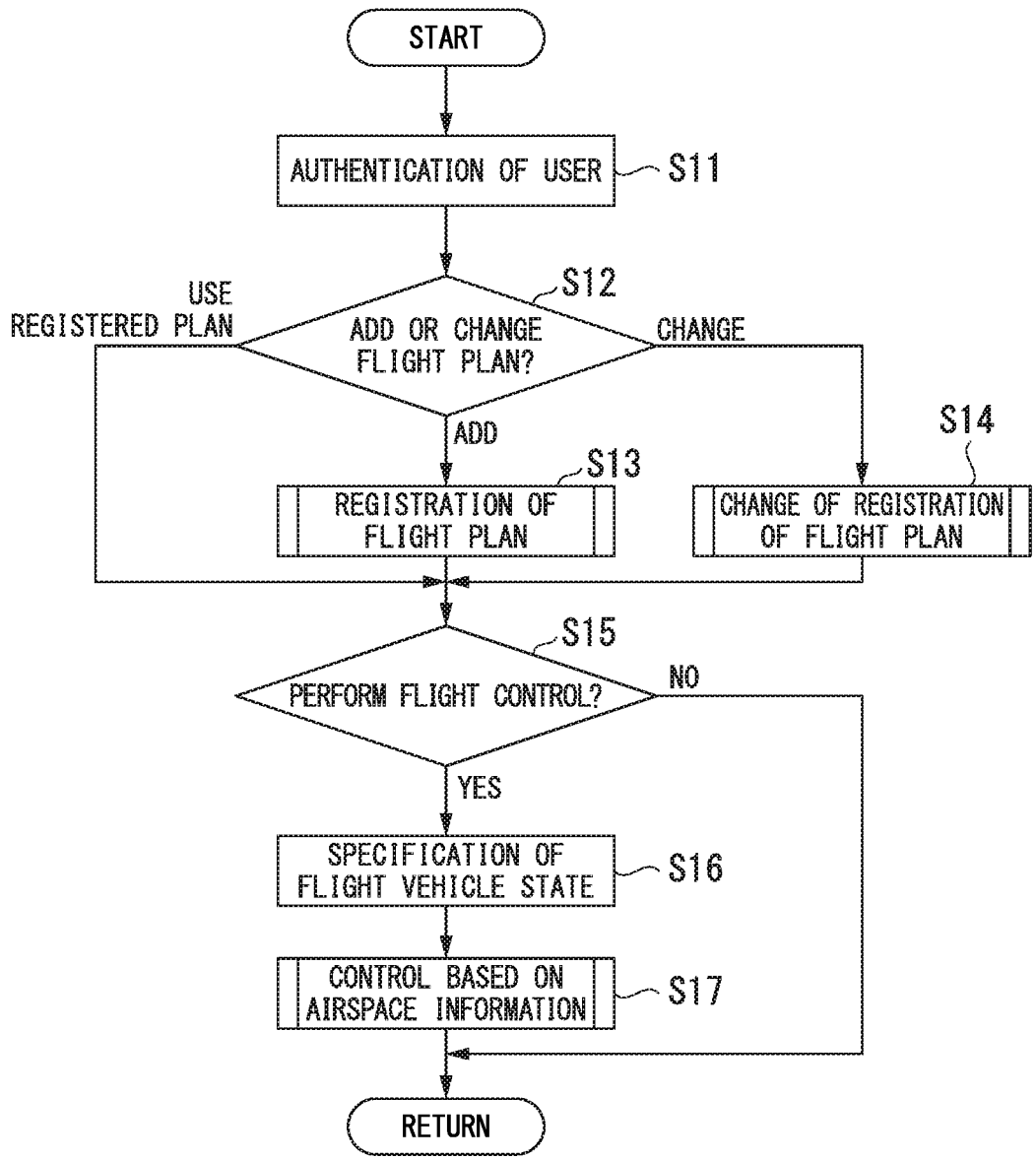
FIG. 5 is a flowchart that shows an outline of the process procedure of managing the flight of a flight vehicle in the flight permitted airspace setting device of the first embodiment.

Referring to FIG. 5, an outline of the process of managing the flight of the flight vehicle 2 in the flight permitted airspace setting system 1 will be described. FIG. 5 is a flowchart that shows an outline of the process procedure of managing the flight of a flight vehicle 2 in the flight permitted airspace setting device 3 of the present embodiment. The process of managing the flight of the flight vehicle 2 shown in FIG. 5 is carried out for the flight vehicle 2 and the user terminal 4 that have been registered in advance.

After the advance registration of the flight vehicle 2 and user terminal 4, the flight vehicle pilot management unit 315 receives a request from the user terminal 4. The flight vehicle pilot management unit 315 carries out an authentication process to confirm whether the user who sent the request is qualified as a pilot of the flight vehicle 2 (Step S11).

Next, when a user is qualified, the flight management unit 317 judges whether there is a request to add or change a flight plan (Step S12). When adding a new flight plan, the flight management unit 317 performs registration of the flight plan to be added to update the flight vehicle airspace information (Step S13), notifies the flight vehicle 2, of the flight plan that has been updated by registration, and performs the process of Step S15. When changing a flight plan that is registered, the flight management unit 317 performs a change process to update the flight vehicle airspace information 122. (Step S14), notifies the flight vehicle 2 of the flight plan that has been updated by the change, and performs the process of Step S15.

Next, when either process of Step S13 and Step S14 is completed, or when using an already registered flight plan, the flight management unit 317 determines whether or not to perform flight control on the basis of information from the user terminal 4 (Step S15). When not performing flight control, the flight management unit 317 ends the series of processes shown in FIG. 5. When performing flight control, the flight management unit 317 carries out a process to specify the state of the flight vehicle 2 that is the object of flight control (Step S16).

Next, the flight management unit 317 manages the flight of the flight vehicle 2 on the basis of the airspace information (Step S17). The flight management unit 317 for example controls the flight of the flight vehicle 2 by control of the flight vehicle control processing unit 311.

Hereinbelow, a more specific example of the process of managing flight of the flight vehicle 2 in the flight permitted airspace setting system 1 is shown and described in detail.
(Advance Registration of Flight Vehicle and User)

The flight permitted airspace setting device 3 performs a process of registering the flight vehicle 2 and the user terminal 4 as terminal devices of the flight permitted airspace setting system 1 prior to flight. For example, a flight vehicle model information storage unit 321 of the flight permitted airspace setting device 3 pairs and stores identification information for identifying the flight vehicle 2 and the user terminal 4. The flight permitted airspace setting device 3 manages the flight vehicle 2 and the user terminal 4 whose device identification information is stored in the flight vehicle model information storage unit 321 as terminal devices of the flight permitted airspace setting system 1 to support the flight control of the flight vehicle 2. In contrast, for a flight vehicle 2 that is an unregistered device and therefore whose identification information is not stored in the flight vehicle model information storage unit 321, the flight permitted airspace setting device 3 does not support flight control. When making an unregistered flight vehicle 2 and user terminal 4 terminal devices of the flight permitted airspace setting system 1, the flight permitted airspace setting device 3 carries out a process of registering the unregistered flight vehicle 2 and user terminal 4. Thereby, the flight permitted airspace setting device 3 enables processing of the flight vehicle 2 and the user terminal 4, post registration, as target terminal devices.

FIG. 6 is a diagram showing an example of the flight vehicle model information stored in the flight vehicle model information storage unit 321. The flight vehicle model information includes information that associates a flight vehicle management number, model information, classification information, user identification information, first identification information, and second identification information. The flight vehicle management number is management information of the flight vehicle 2. The model information is a model code for identifying the model name or model of the flight vehicle 2. The classification information is information that shows the result of classifying the model of the flight vehicle 2. The user identification information is identification information that enables identification of the user terminal 4. The first identification information is identification information that enables identification of the flight vehicle 2. The second identification information is identification information that enables identification of the user of the flight vehicle 2. The above-mentioned flight vehicle model information constitutes a data group for every flight vehicle 2, and is stored in the flight vehicle type information storage unit 321. The flight permitted airspace setting device 3 obtains the above-mentioned information showing the correspondence between the flight vehicle 2 and the user terminal 4 from the user terminal 4 and writes the information in the flight vehicle type information storage unit 321.

When the flight vehicle information storage unit 221 of the flight vehicle 2 stores a flight vehicle management number, model information, model code and classification information, the flight permitted airspace setting device 3 may obtain the flight vehicle management number, model information, model code and classification information from the flight vehicle information storage unit 221 of the flight vehicle 2 and perform storage in the flight vehicle model information storage unit 321.
(Airspace Managed for Each Flight Vehicle)

The flight permitted airspace setting system 1 sets airspace that allows flying for each flight vehicle 2, and manages the flight state for each flight vehicle 2. The flight permitted airspace setting system 1 classifies and manager airspace as follows.

The flight permitted airspace setting system 1 broadly divides the airspace of a target range into flight possible airspace and flight prohibited airspace ZZ. The flight prohibited airspace ZZ is airspace in which flight of all flight vehicles 2 is prohibited. The flight possible airspace is airspace in which flight is permitted or not permitted depending on conditions determined for each flight vehicle 2. The flight permitted airspace setting system 1 for example classifies flight possible airspace into one of the following airspaces in accordance with the conditions.

Airspace ZA which may be flown regardless of the airframe as long as the user is a specific user.
Airspace ZB which may be flown regardless of the user if that airframe class.
Airspace ZD which may be flown if that airframe and a specified user.
Airspace ZC which may be flown if that airframe class and a specified user.

When the flight conditions required of each flight vehicle 2 satisfy the conditions of any airspace of the aforementioned classification, the flight permitted airspace setting system 1 makes that airspace flight permitted airspace as airspace corresponding to the satisfied conditions. When the conditions are not satisfied, the airspace is made flight not-permitted airspace as airspace corresponding to the unsatisfied conditions.

Flight conditions in airspace may differ in individual cases, such as the case of there being an airport within a target airspace or near that airspace, and airspace not beyond a predetermined distance from that airport being made airspace that cannot be flown, or the case of flight being allowed, with restrictions, when approval is obtained. In these cases, the flight airspace setting unit 312, for each airspace, determines and sets the flight conditions of positions specified by three-dimensional position information on the basis of the latitude and longitude of the ground surface corresponding to that airspace and the altitude.

FIG. 7 is a diagram that shows an example of the flight airspace information (flight plan of DR01) of the flight vehicle 2 stored in the flight airspace information storage unit 322. This flight airspace information corresponds to the flight plan of a specific flight vehicle 2. The same flight airspace information is generated for every flight vehicle 2 being managed and stored in the flight airspace information storage unit 322. Information that correlates a plan number, date information, airspace information, base station identification information, and user identification information is included in the flight airspace information storage unit 322.

The plan number is identification information that makes a series of information specifying one flight of the flight vehicle 2 a flight plan, and enables identification of that flight plan. The date information shows the period in which the flight of the flight plan is scheduled. When repeating the same flight, the period in which the flight is repeated is indicated.

Airspace information is information for identifying the airspace where the flight vehicle 2 flies. For example, airspace information includes position information of the flight vehicle 2, altitude information, base station identification information, airspace determination information, and the like.

Position information is information which indicates the airspace in which the flight vehicle 2 is to be flown by latitude, longitude, and the like. For example, the position information may be information that shows the range in which flight is planned, or may be information that indicates the order in which transit points in a flight course are to be passed. The position information may also instead be information which shows the region that is divided based on other units.

Altitude information is information that shows the altitude range in which the flight vehicle 2 is to be flown, and for example is stipulated in a length unit. For example, the following conditions can be indicated by this altitude information. For example, condition (1) is a condition that permits flight when the altitude is less than 150 m and prohibits flight when the altitude exceeds 150 m. Condition (2) is a condition that gives priority to autonomous flight by auto pilot when the altitude is less than 150 m and a threshold altitude is exceeded. Condition (3) is a condition that gives priority to control from the user terminal 4 when under the threshold altitude. The aforementioned are merely examples, with conditions not being limited thereto.

The base station identification information is identification information of the wireless base station 6 which includes the region specified by the position information in a communication range (cell). The airspace determination information sets the region specified by the position information as airspace, and shows the classification result of that airspace.

The user identification information is identification information that enables identification of the user terminal 4, and is used as information for identifying a user.

Information based on a plan that a user requests, and management information for flying the flight vehicle 2 with regard to the stipulated conditions are included in the flight airspace information storage unit 322.

For example, in FIG. 7, the flight vehicle management number shows the flight plan corresponding to the flight plan of the flight vehicle 2 of DR01. The flight plan corresponding to plan numbers U1 and U2 is information based on a plan requested by the user. The plan number U1 indicates that flight at altitude H1 or below is scheduled at the position designated as "latitude/longitude range" from start time T1 to end time T2 on a certain day. For example, the flight airspace setting unit 312 obtains and writes the aforementioned information from the user terminal 4. On the basis of the aforementioned information, the flight airspace setting unit 312, referring to a conversion table that is not illustrated, determines the wireless base station 6 that has a cell corresponding to the aforementioned position and writes that base station ID (Z001) as the base station identification information. The flight airspace setting unit 312 writes ZA as the airspace determination information or the cell whose base station ID is determined to be Z001.

For example, the information corresponding to plan numbers M1, M2, and M3 and the like is management information for flying the flight vehicle 2 in accordance with stipulated conditions. Plan number M1 indicates that the movement from the current position of the flight vehicle 2 to the landing point is at all times flight at altitude range A. Plan number M2 indicates that flying within a designated altitude range at the present latitude/longitude. The altitude at which the flight vehicle 2 flies is subject to the constraints of an altitude range that is restricted with rules, a range in which a collision of an obstruction can be avoided, and a range in which radio waves MAP of the wireless base station 6 reach. When plan number M2 is specified, the flight vehicle 2 corrects its altitude so as to be within the designated altitude range. The plan number M3 indicates a flight prohibited airspace ZZ, and that the wireless base station 6, which is identified by Z011 . . . or the like is included in that range. When movement to the airspace designated by the plan number M3 is detected, the flight vehicle 2 aborts flight within that range. For example, the flight vehicle 2 promptly moves out of the range.

The flight vehicle 2 uses information corresponding to the flight numbers M1, M2, M3 as information that takes priority over airspace conditions set at the request of the user. By setting restrictions based on regulated rules as these flight numbers M1, M2, M3 and the like, it is possible to collectively set processes that are set for each individual airspace.

Identification information for identifying the flight vehicle 2 or the user of the flight vehicle 2, and airspace information that indicates flight permitted airspace or flight not-permitted airspace of the flight vehicle 2 are associated and stored in the flight airspace information storage unit 322 as described above. By constituting the flight airspace information storage unit 322 in the above manner, it becomes possible to change the method of flight control by the addition of altitude to conditions, unlike the case of conditions being specified only with latitude and longitude.

In this way, the flight airspace setting unit 312 sets airspace information that indicates flight permitted airspace or flight not-permitted airspace as airspace information of the flight vehicle 2 based on the model of the flight vehicle 2. The flight airspace setting unit 312, in addition to writing the set airspace information in the flight airspace information storage unit 322, sends the airspace information to the control unit 21 of the flight vehicle 2 to be written in the flight vehicle airspace information storage unit 222 by the control unit 21. The flight vehicle airspace information storage unit 222 is for example constituted similarly to the flight airspace information storage unit 322. The control unit 21 receive the airspace information of the flight vehicle 2 and write the airspace information to the flight vehicle airspace information storage unit 222 as is. Here, the airspace information of the flight vehicle 2 may also include three-dimensional map information and route guide data.

The flight permitted airspace setting system 1, by performing the aforementioned process, shares the airspace information of the flight vehicle 2 between the flight vehicle 2 and the flight permitted airspace setting device 3.

The flight airspace setting unit 312 may specify the model of the flight vehicle 2 on the basis of flight vehicle model information registered in the flight vehicle model information storage unit 321, or instead may acquire the flight vehicle model information directly from the user terminal 4.

The flight permitted airspace setting system 1 uses the communication service by wireless communication through the wireless base station 6. For regions not easily reached by radio waves from the wireless base station 6, the communication service may no longer be usable. The flight permitted airspace setting system 1 may set a flight condition for that kind of airspace separately from the condition based on the aforementioned position information.

(User Authentication)

Flight of the flight vehicle 2 may be restricted by the qualifications and experience of the user. The flight permitted airspace setting system 1 performs a user authentication process when carrying out various processes in order to specify the user. One example of the user authentication process in the flight permitted airspace setting system 1 will be described.

For example, the flight permitted airspace setting system 1 authenticates a user by the following method. The flight permitted airspace setting system 1 uses a wireless communication line that makes the wireless base station 6 an access point. As mentioned above, the flight vehicle 2 and the user terminal 4 are terminal devices that use a communication service that communicates via the wireless base station 6.

The network NW side equipment registers all terminal devices that permit communication as being terminal devices in which use of the communication service is permitted, and carries out a verification process on each terminal device using the identification information of the terminal device. Identification information that enables specification of a terminal device, and identification information for identifying the user using the communication service are used for the verification.

In the case of the flight vehicle 2 of the present embodiment, the identification information that enables specification of a device is stored in the first identification information storage unit 225, and the identification information for identifying the user using the communication service is stored in the second storage unit 23. The flight permitted airspace setting device 3 communicates via the wireless base station 6 using the above-mentioned identification information. The flight permitted airspace setting device 3 sets the airspace of the target flight vehicle 2 using the same identification information as the above.

For example, in the flight permitted airspace setting system 1, it is possible to constitute the second storage unit 23 as an IC card. A SIM (subscriber identity module) card is known as an example of an IC card. An IMSI (international mobile subscriber identity) that can specify of a communication user is written in the SIM card.

The flight permitted airspace setting system 1 uses the identification information written in the SIM card to specify the user of the communication service.

The first method is a method that performs identification using a user's identification information stored in the second storage unit 23 (SIM card) of the flight vehicle 2. For example, the control unit 21 reads the identification information IMSI from the second storage unit 23 (SIM card) of the flight vehicle 2 and notifies the flight permitted airspace setting device 3 of authentication information generated on the basis of the identification information IMSI. The flight permitted airspace setting device 3 stores in advance authentication information of the flight vehicle 2 or authentication information generated on the basis of the identification information IMSI, and performs collation with the received authentication information.

The second method is a method of performing identification using a user's identification information stored in the storage unit (SIM card) of the user terminal 4 that is used when flying the flight vehicle 2. For example, the user terminal 4 includes a control unit 41, a first storage unit 42, and a second storage unit 43 (refer to FIG. 1). The first storage unit 42 and the second storage unit 43 correspond to the first storage unit 22 and the second storage unit 23 in terms of storing identification information. The control unit 41 of the user terminal 4 reads the identification information IMSI from the second storage unit 43 and notifies the flight permitted airspace setting device 3 of authentication information generated on the basis of the identification information IMSI. The flight permitted airspace setting device 3 stores in advance the identification information IMSI of the user terminal 4 or authentication information generated on the basis of the identification information IMSI, and performs collation with the received authentication information. Since it is possible to perform user authentication without using the flight vehicle 2, this second method is suited to the case of for example performing registration or change of a flight plan prior to flight.

The flight permitted airspace setting device 3 may specify a user by either method of the above-mentioned two methods, and may specify that the combination of the flight vehicle 2 and the user is a proper combination by combining both methods.

(Registration Process of the Flight Plan)

FIG. 8 is a flowchart that shows the procedure of the flight plan registration process of the present embodiment. The control unit 31 of the flight permitted airspace setting device 3 obtains flight-plan information that shows the flight plan of the flight vehicle 2 for which registration is planned from the user terminal 4 (Step S131). For example, the user terminal 4 displays a two-dimensional or three-dimensional map, and receives an operation of the user directing the flight of the flight vehicle 2. For example, the user terminal 4 receives operations specifying the model of the flight vehicle, user identification information, the flight vehicle takeoff and landing locations, the flight destination, the time, and the purpose of the flight indicating processes to be carried out during flight. The user terminal 4 transmits information corresponding to the received operations to the flight permitted airspace setting device 3 as flight-plan information.

The flight management unit 317 verifies whether or not the flight plan of the obtained flight plan information is valid on the basis of flight vehicle model information stored in the flight vehicle type information storage unit 321 (Step S132) and determines whether or not to approve the flight plan (Step S133). For example, on the basis of the model information of the flight vehicle 2 and the user identification information, the flight management unit 317 verifies whether or not the flight vehicle model information corresponds to the flight plan of the flight vehicle 2 that is registered in advance in the flight vehicle type information storage unit 321, and that the airspace scheduled to be flown through according to the flight plan is included in the airspace for which the flight vehicle 2 has permission. The flight management unit 317, upon determining that the flight plan should be approved, notifies the user terminal 4 of the approval of the flight plan (Step S134). The flight management unit 317 registers the approved flight plan in the flight airspace information storage unit 322 (Step S135), notifies the flight vehicle 2 of the approved flight plan (Step S136), and ends the series of processing.

When the flight plan is determined to not be one that should be approved, the flight management unit 317 notifies the user terminal 4 of non-approval of the flight plan (Step S137), and ends the series of processing. When the flight vehicle 2 has received notification of the approved flight plan, the flight state control unit 214 writes that flight plan to the flight vehicle airspace information storage unit 222 for updating.

The flight management unit 317, by referring to the model information of the flight vehicle 2 as described above, may also set a flight condition based on the result of the model, and model classification.

(Flight Plan Change Process)

Figure 9:
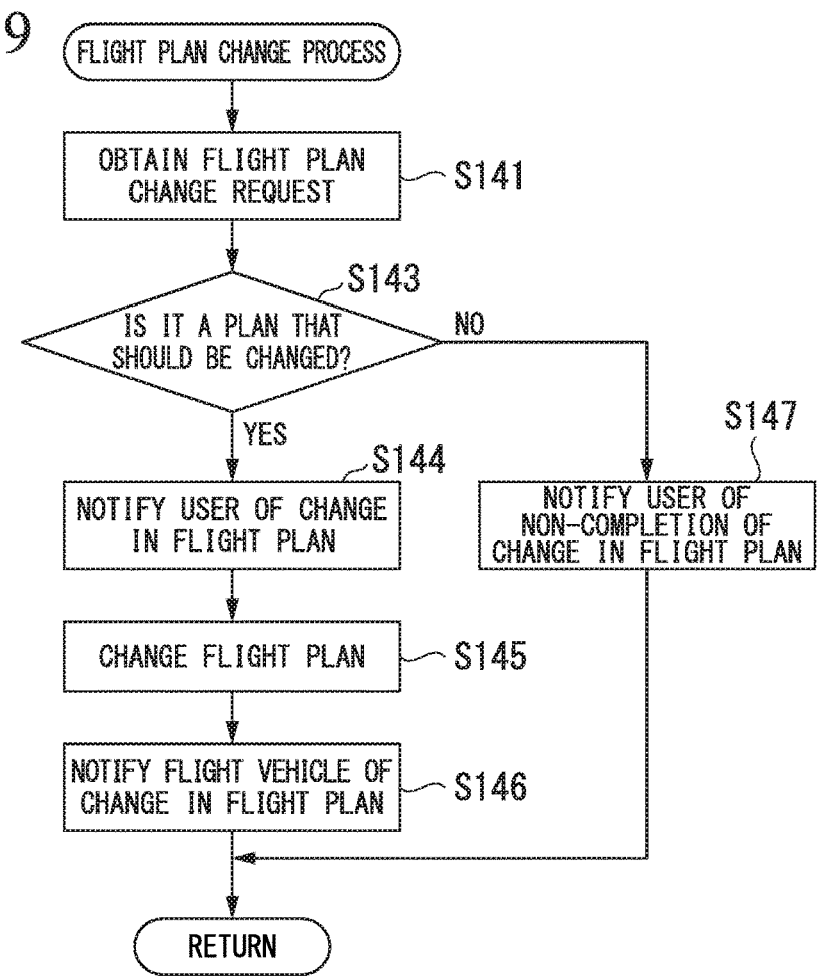
FIG. 9 is a flowchart that shows the procedure of the flight plan change process of the first embodiment.

FIG. 9 is a flowchart that shows the procedure of the flight plan change process of the present embodiment. The control unit 31 of the flight permitted airspace setting device 3 obtains a request to change flight plan information that has been registered from user terminal 4 (Step S141). The control unit 31 determines whether the flight plan is valid on the basis of the flight vehicle model information stored in the flight vehicle type information storage unit 321. The flight management unit 317 determines whether or not the flight plan information that is the object of the obtained change request is stored in the flight airspace information storage unit 322, and whether the flight plan of the flight-plan information is a flight plan that should be changed (Step S143). When the flight plan is determined to be a flight plan that should be changed, the flight management unit 317 notifies the user terminal 4 of the flight plan change (Step S144). The flight management unit 317 registers the changed flight plan with the flight airspace information storage unit 322 (Step S145), notifies the flight vehicle 2 of the changed flight plan (Step S146), and ends the series of processing.

When the flight plan is not a flight plan that should be changed, the flight management unit 317 notifies the user terminal 4 that the request to change the flight plan has not been completed (Step S147), and ends the series of processing.

The flight state control unit 214 of the flight vehicle 2 that has received the notification of the changed flight plan writes the flight plan to the flight vehicle airspace information storage unit 222 for updating.

(Specification of State of Flight Vehicle)

The flight vehicle 2 detects a communication request sent from the flight permitted airspace setting device 3, and as a response to that request notifies the flight permitted airspace setting device 3 of the information that the flight vehicle 2 has obtained while in-flight. The flight management unit 317, by receiving the response from the flight vehicle 2, specifies whether the flight vehicle 2 is in a flight preparation state or flying.

(Control Based on Airspace)

In addition to the aforementioned specification of the state of the flight vehicle 2, the flight permitted airspace setting device 3 monitors the flight state of the flying flight vehicle 2, and controls the flight of the flight vehicle 2 as required so that the flight vehicle 2 does not deviate from airspace.

The flight management unit 317 obtains information indicating the position of the flight vehicle 2 by a method given below to detect the flight situation from the information indicating the obtained position. For example, the flight vehicle 2 transmits a response that includes the own vehicle position information IP. The flight management unit 317 detects whether or not the position at which the flight vehicle 2 is flying is a proper position on the basis of the own vehicle position information IP. In this case, the flight management unit 317 detects whether or not the position according to the own vehicle position information IP is included in a range shown by the airspace information of the flight plan registered in the flight airspace information storage unit 322.

As another method, the flight management unit 317 may detect whether or not the position at which the flight vehicle 2 is flying is a proper position on the basis of the base station ID of the wireless base station, instead of the own vehicle position information IP. When the flight vehicle 2 transmits a response containing that base station ID, the flight management unit 317, upon receiving the response from the flight vehicle 2, detects whether or not the position indicated by the base station ID contained in the response is included in the base station IDs of the flight plan registered in the flight airspace information storage unit 322, and thereby may detect whether or not the position at which the flight vehicle 2 is flying at a proper position.

Although an example of the process of controlling the flight vehicle 2 using the own vehicle position information IP is shown below, the present invention is not limited thereto, and the flight permitted airspace setting device 3 may control the flight vehicle 2 using the base station ID by a similar method.

Figure 10:
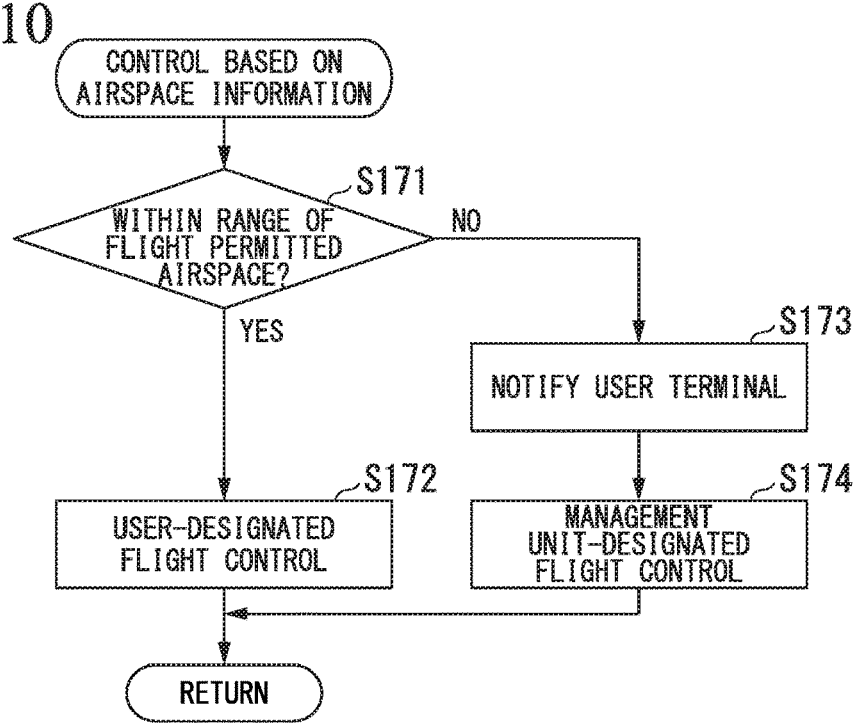
FIG. 10 is a flowchart that shows the procedure of control based on airspace of the first embodiment.

FIG. 10 is a flowchart that shows the procedure of airspace-based control of the present embodiment. The flight management unit 317 of the flight permitted airspace setting device 3, upon receiving the own vehicle position information IP from the flight vehicle 2, judges based on the own vehicle position information IP whether the airspace in which the flight vehicle 2 is flying is within the range of the flight permitted airspace (Step S171). When the flight vehicle 2 is flying within the range of the flight permitted airspace, the flight management unit 317 performs control so that the flight vehicle 2 flies in accordance with flight instructions designated by the user via the user terminal 4 (Step S172), and ends the series of processing shown in FIG. 10.

On the other hand, when the flight vehicle 2 is flying outside the range of the flight permitted airspace, the flight state control information transmitting unit 318 notifies the user terminal 4 of the situation (Step S173). The control information transmitting unit 318 transmits a flight instruction specified by the flight management unit 317 to the flight vehicle 2, controls the flight of the flight vehicle 2 by interrupting the flight instruction designated by the user (Step S174), and ends the series of processing shown in FIG. 10.

As described above, in addition to setting in advance the airspace in which the flight vehicle 2 flies, the flight permitted airspace setting device 3 controls the flight of the flight vehicle 2 that is flying in a manner deviating from the set airspace. The flight permitted airspace setting device 3 repeatedly carries out the aforementioned series of processing according to a predetermined cycle.

(Flight Control of Flight Vehicle)

The flight vehicle 2, in accordance with the procedure of the following flight control, flies according to control from the user terminal 4 through airspace set by the flight permitted airspace setting device 3. For example, in the case of the flight plan set by the flight permitted airspace setting device 3 indicating a transit point in a flight course, the flight vehicle 2 moves by autonomous flight via auto pilot along a flight course that interpolates the designated transit point.

FIG. 11 is a flowchart that shows the procedure of flight control in the flight vehicle 2 of the present embodiment. The flight state control unit 214 of the flight vehicle 2 determines whether or not there is a control request from the flight management unit 317 or the flight state control information transmitting unit 318 (Step S221).

Next, when there is a control request from the flight management unit 317 or the flight state control information transmitting unit 318, the flight state control unit 214 carries out flight control according to instructions of the flight management unit 317 or the flight state control information transmitting unit 318 (Step S222), and ends the series of processing shown in FIG. 11.

On the other hand, when there is no control request from the flight management unit 317 or the flight state control information transmitting unit 318, the flight state control unit 214 compares the present flight position and the airspace information on the basis of the flight position of the flight vehicle 2 and the airspace information stored in the flight vehicle airspace information storage unit 222 (Step S223), and determines whether or not the present flight position is within the range of the flight per airspace (Step S224).

Next, when the present flight position is within the range of the flight permitted airspace, the flight state control unit 214 determines whether or not the present altitude is within the range of a predetermined altitude (Step S225). The aforementioned predetermined altitude is the altitude that is defined based on the range of the flight permitted airspace, and is a predetermined value that does not exceed the altitude limit of the flight permitted airspace to the not-permitted side. When the present altitude is within the range of the predetermined altitude, the flight state control unit 214 performs flight control in accordance with the directions of the user (Step S227), and ends the series of processing shown in FIG. 11. For example, a user instruction includes a user operation being detected by the user terminal 4, and information concerning the detected operation being transmitted to the flight permitted airspace setting device 3. The control unit 31 generates an instruction based on the information relating to the operation and transmits at instruction to the flight vehicle 2. The flight state control unit 214 receives that instruction, and executes flight control in accordance with the aforementioned directions of the user.

When the present altitude is determined to not be within the range of the predetermined altitude based on the determination result of Step S225, the flight state control unit 214 executes autonomous flight control in accordance with the flight plan (Step S228), and ends the series of processing shown in FIG. 11.

When e present flight position is not within the range of the flight permitted airspace, the flight state control unit 214 executes autonomous flight control that corrects the position at which the flight vehicle 2 is flying so as to be within the range of the flight permitted airspace (Step S229), and ends the series of processing shown in FIG. 11.

The flight state control unit 214 repeatedly carries out the aforementioned series of processing according to a predetermined cycle.

According to the first embodiment described above, the flight vehicle control device 20 includes either identification information storage unit of the first identification information storage unit 225 in which identification information for identifying the flight vehicle 2 is stored and the second storage unit 23 in which identification information for identifying the user of the flight vehicle 2 is stored; the control device communication unit 213 that performs communication with the wireless base station 6 on the basis of the identification information stored in the identification information storage unit; the own vehicle position measuring unit 212 that measures the position of the own flight vehicle 212; airspace information indicating flight permitted airspace or flight not-permitted airspace that the control device communication unit 213 receives from the wireless base station 6; and the flight state control unit 214 that controls the flight state of the own flight vehicle on the basis of the own vehicle position measured by the own vehicle position measuring unit 212. Thereby, it is possible, with a simpler configuration, to enhance reliability when controlling the flight of a flight vehicle.

The flight state control information transmitting unit 318 of the flight permitted airspace setting device 3, on the basis of the flight position of the flight vehicle 2 and the airspace information stored in the flight airspace information storage unit 322, transmits flight state control information for controlling the flight state of the flight vehicle 2 to the flight state control unit 214. For example, setting information that indicates whether or not to switch a control state for controlling the flight state of the flight vehicle 2 is one example of the flight state control information that the flight state control unit 214 controls. Thus, the flight permitted airspace setting device 3, by performing control by means of setting information that indicates whether or not to switch the control state that controls the flight state of the flight vehicle 2, is able to perform control that switches the flight state in the flight vehicle 2.

The flight permitted airspace setting system 1 also uses authentication information of the user of the communication service used when using the network NW mentioned above for the airspace setting process of the flight vehicle 2. For this reason, there is no need to define information for a new authentication process, and moreover it is possible to secure the desired reliability even with a simplified authentication process.

(Modification of First Embodiment)

A modification of the first embodiment will be described.

The flight state control information transmitting unit 318 shown in the first embodiment, on the basis of the flight position of the flight vehicle 2 and the airspace information stored in the flight airspace information storage unit 322, transmits flight state control information for controlling the flight state of the flight vehicle 2 to the flight state control unit 214. One example illustrated that the flight state control information controlled by the flight state control unit 214 in the first embodiment is setting information that indicates whether not to switch the control state.

Instead, the flight state control information controlled by the flight state control unit 214 in the modification may be information including a control program executed by the flight state control unit 214. By the control program that is updated or added, the flight state control unit 214 carries out a process that differs from the process by the control program prior to being updated or prior to being added.

As described above, according to the modification of the first embodiment, it is possible to carry out precise control accordance with the state, in addition to exhibiting the same effect as the first embodiment.

Second Embodiment

A second embodiment will be described. The flight vehicle 2 of the second embodiment is constituted without providing the flight vehicle information storage unit 221 in the first storage unit 22. Also, the flight permitted airspace setting device 3 is constituted without providing the flight vehicle type information storage unit 321 in the storage unit 32. When model information storage units are not provided in the above manner, the flight permitted airspace setting device 3 sets the flight permitted airspace of the flight vehicle 2 without identifying each flight vehicle 2 or specifying the model of the flight vehicle 2.

Even if the flight permitted airspace setting device 3 does not include the flight vehicle type information storage unit 321 in the aforementioned manner, setting of the airspace information (flight permitted airspace) is possible by a method such as transmitting the necessary information from the user terminal 4. In the abovementioned case, the flight permitted airspace setting system 1 assumes a form of the user directly registering airspace information without relying on the model information. Thus, in the case of being able to set the airspace information regardless of the airframe or model, the flight permitted airspace setting system 1 can set the airspace requested by the user terminal 4 for the flight vehicle 2 that is the setting target, without being limited by the airframe or model of the flight vehicle 2.

The second embodiment described above, in addition to exhibiting the same effect as the first embodiment, can further simplify the setting process of the flight vehicle 2.

Third Embodiment

A third embodiment will be described. Although the flight permitted airspace setting system 1 of the first embodiment was described as including the flight vehicle 2 containing the flight vehicle control device 20, the flight permitted airspace setting device 3, and the user terminal 4, it is not limited thereto. In the flight permitted airspace setting system 1 of the third embodiment, the flight permitted airspace setting device 3 may have the function of the user terminal 4 or vice versa.

The third embodiment described above, in addition to exhibiting the same effect as the first embodiment, can make the flight permitted airspace setting device 3 and the user terminal 4 one device.

Fourth Embodiment

A fourth embodiment will be described. In the fourth embodiment, the processes performed by the flight permitted airspace setting device 3 and the user terminal 4 differ compared to the first embodiment. Hereinbelow this point will be described.

The flight permitted airspace setting device 3 determines the airspace where flight of the flight vehicle 2 is permitted on the basis of information obtained from the user terminal 4 and rules determined in advance. For example, regarding the process of determining the airspace that permits flight by the flight vehicle 2, the process of FIG. 8 described above will be referred to. After determining the airspace that permits flight by the flight vehicle 2, the flight permitted airspace setting device 3 generates an application program including information indicating the airspace that permits flight, and stores the application program in the storage unit 32 to be downloadable. The above-mentioned application program is a program for controlling the flight vehicle 2 that is executed by the control unit 41 of the user terminal 4.

The user terminal 4 downloads the above-mentioned application program from the flight permitted airspace setting device 3 and stores the application program in the first storage unit 42. For example, when the user is actually flying the flight vehicle 2, the user launches the application program on the user terminal 4. The user terminal 4 receives operations of the user piloting the flight vehicle 2 by the execution of the application program by the control unit 41. The user terminal 4 verifies whether the directions for piloting the flight vehicle 2 are directions corresponding to the time and position of the flight plan that has been approved. Moreover, the user terminal 4 verifies whether the flight vehicle 2 is an approved flight vehicle. Thus, when flying the flight vehicle 2, the user terminal 4 solely determines whether that flight is a flight approved in the flight plan, and controls the flight of the flight vehicle 2 by communicating with the flight vehicle 2 without relaying communication through the flight permitted airspace setting device 3. In that case, the user terminal 4 and the flight vehicle 2 communicate through the communication network 5 and the wireless base station 6.

The user terminal 4 continues to capture the position of the flight vehicle 2 while flying the flight vehicle 2. For example, when the flight vehicle 2 departs from the range of the flight permitted airspace and deviates from the scheduled flight-plan route, the user terminal 4 controls the flight of the flight vehicle 2 with priority over user operations by the process of the application program. For example, a process of controlling the flight of the flight vehicle 2 that takes priority over user operations includes the user terminal 4 forcibly correcting the flight route by adjusting the position of the flight vehicle 2 and restricting the flight so as not to fly in prohibited airspace.

The fourth embodiment described above can reduce the processing by the flight permitted airspace setting device 3 and enhance responsiveness when controlling the flight vehicle 2 by distributing the process of controlling the flight vehicle 2 to the user terminal 4, in addition to exhibiting the same effect as the first embodiment.

As described above, the flight vehicle control device 20 is controlled on the basis of control instructions generated by the user terminal 4 that has detected remote operations of the flight vehicle 2 by the user. Control instructions generated by the user terminal 4 are included in the control information received via the wireless base station 6. Moreover, control instructions for controlling the flight vehicle 2 from a remote place that are generated by the flight permitted airspace setting device 3 may be included as control information received via the wireless base station 6. For example, by enabling the performance of such control, during an emergency in which the flight vehicle 2 can no longer receive control from the user terminal 4 for some reason, the flight permitted airspace setting device 3 may instead carry out that control.

When a new flight route has been set during flight, the flight route and three-dimensional map, in addition to being set in the flight vehicle 2, may also be stored in the user terminal 4. The user terminal 4 may also perform route guidance using the flight route and three-dimensional map. When setting a new route, the required amount of electrical power to the destination and the time required for reaching the destination are recalculated, and a determination may be made on whether the destination is reachable on the basis of the calculation result. When a determination is made that the destination cannot be reached, the user terminal 4 may show a route to a location that can supply electrical power to the flight vehicle 2.

The flight permitted airspace setting system 1 may be constituted by affixing the second storage unit 23 to a circuit substrate instead of constituting the second storage unit 23 as an IC card. However, the flight permitted airspace setting system 1 is not limited to such a constitution. The flight permitted airspace setting system 1 may store data generated on the basis of an IMSI by inclusion in the identification information of the second storage unit 23.

In addition, in the case of the constitution as described above, the second identification information may be stored by allocating the second storage unit 23 to a portion of the first storage unit 22.

The embodiments and modifications of the present invention are described above, but are simply examples for the purpose of describing the present invention and the scope of the present invention is not limited to these embodiments and these modifications alone. The embodiments and modifications thereof may be put into practice in various further modes, and various omissions, replacements, and modifications can be made in a range without departing from the scope of the invention. These embodiments and modifications thereof fall within the scope and gist of the invention and fall within the invention recited in the claims and their equivalents.

Each of the devices mentioned above includes a computer therein. The procedure of each process described above is stored in a computer-readable recording medium in a program format, and the process is performed by the computer reading and executing the program. In this case, the computer-readable recording medium includes a magnetic disk, a magneto optical disc, a CD-ROM, a DVD-ROM, a semiconductor memory, or the like. In addition, the computer program may be delivered to the computer by a communication line, and the computer that has received the delivery may perform the delivered program.

In addition, the program described above may be one for realizing some of the functions described above. In addition, the program may be a differential file (differential program), that is, one that can be realized by combining the functions described above with the program that is already stored in the computer system.

INDUSTRIAL APPLICABILITY

The present invention may be applied to a flight vehicle control device, a flight permitted airspace setting system, and a flight vehicle control method and program.

DESCRIPTION OF THE REFERENCE SYMBOLS

1: Flight permitted airspace setting system
2: Flight vehicle
20: Flight vehicle control device
3: Flight permitted airspace setting device

The invention claimed is:
1. An unmanned flight vehicle comprising:
a rotor;
a motor rotating the rotor; and
a flight vehicle control device, controlling the motor and the unmanned flight vehicle, comprising:
a memory storing airspace information and identification information, wherein the airspace information comprises information about an airspace in which the unmanned flight vehicle flies and the identification information comprises identification information that enables identification of a user of a communication service for receiving first control information via a wireless base station by the unmanned flight vehicle; and
a processor that controls the unmanned flight vehicle to communicate with the wireless base station based on the stored identification information,
wherein the processor controls a flight state of the unmanned flight vehicle based on the airspace information and the first control information, the first control information being received via the wireless base station by using the identification information, and
the processor controls the unmanned flight vehicle located in a cell which is set for the wireless base station to receive a base station identifier from the wireless base station, the base station identifier information being information for identifying the wireless base station.
2. The unmanned flight vehicle according to claim 1, wherein the memory stores a program for the unmanned flight vehicle to fly by auto pilot, and
the processor controls the unmanned flight vehicle by auto pilot based on the stored program, depending on a quality of a radio wave that the unmanned flight vehicle has received from the wireless base station.
3. The unmanned flight vehicle according to claim 2, wherein the processor controls the unmanned flight vehicle by auto pilot based on the stored program, in a case where a size of the radio wave is less than a predetermined value.
4. The unmanned flight vehicle according to claim 1,
wherein the airspace information comprises information that indicates a flight course along which the unmanned flight vehicle flies.
5. The unmanned flight vehicle according to claim 4, wherein the processor controls the unmanned flight vehicle along the flight course by auto pilot.

6. The unmanned flight vehicle according to claim 1, wherein the processor determines whether a position at which the unmanned flight vehicle is flying is within a range of a flight permitted airspace associated with the unmanned flight vehicle.

7. The unmanned flight vehicle according to claim 6, wherein when the processor determines that the position at which the unmanned flight vehicle is flying is not within the range of the flight permitted airspace, the processor controls the unmanned flight vehicle by auto pilot so that the unmanned flight vehicle flies within the flight permitted airspace.

8. The unmanned flight vehicle according to claim 1, wherein the processor receives the first control information via the wireless base station by using the identification information, the first control information comprising an instruction to control flight of the unmanned flight vehicle, and
the processor controls flight of the unmanned flight vehicle based on the first control information.

9. The unmanned flight vehicle according to claim 8, the processor controls the unmanned flight vehicle executing an autonomous control mode for controlling the flight state of the unmanned flight vehicle based on second control information stored in the memory, the second control information including a program for the unmanned flight vehicle to fly by auto pilot.

10. The unmanned flight vehicle according to claim 1, wherein the identification information comprises an identification number of a communication provider providing the communication service or an identification number assigned to the user from the communication provider.

11. The unmanned flight vehicle according to claim 1, wherein the identification information comprises information related to an international mobile subscriber identity (IMSI).

12. The unmanned flight vehicle according to claim 1, wherein the processor receives the airspace information via the wireless base station.

13. The unmanned flight vehicle according to claim 1, wherein the processor controls the unmanned flight vehicle based on a quality of a radio wave that the unmanned flight vehicle has received from the wireless base station.

14. The unmanned flight vehicle according to claim 1, wherein the processor controls the unmanned flight vehicle to transmit a response comprising the base station identifier.

15. A method for an unmanned flight vehicle that includes a rotor, a motor rotating the rotor, and a flight vehicle control device, the method comprising:
controlling, with the flight vehicle control device, the motor and the unmanned flight vehicle;
communicating, using the flight vehicle control device, with a wireless base station based on identification information stored in a memory of the flight vehicle control device, wherein the identification information comprises identification information that enables identification of a user of a communication service for receiving first control information via the wireless base station by the unmanned flight vehicle;
controlling, with the flight vehicle control device, a flight state of the unmanned flight vehicle based on airspace information stored in the memory and the first control information, wherein the airspace information comprises information about an airspace in which the unmanned flight vehicle flies and the first control information is received via the wireless base station by using the identification information; and
controlling, with the flight vehicle control device, the unmanned flight vehicle located in a cell which is set for the wireless base station to receive a base station identifier from the wireless base station, wherein the base station identifier information is information for identifying the wireless base station.

16. The method according to claim 15, further comprising:
controlling, with the flight vehicle control device, the unmanned flight vehicle by auto pilot based on a program stored in the memory, depending on a quality of a radio wave that the unmanned flight vehicle has received from the wireless base station, wherein the program comprises a program for the unmanned flight vehicle to fly by auto pilot.

17. The method according to claim 15, wherein the airspace information comprises information that indicates a flight course along which the unmanned flight vehicle flies, and
the method further comprises: controlling, with the flight vehicle control device, the unmanned flight vehicle along the flight course by auto pilot.

18. The method according to claim 15, the method further comprising:
determining, with the flight vehicle control device, whether a position at which the unmanned flight vehicle is flying is within a range of a flight permitted airspace associated with the unmanned flight vehicle.

19. The method according to claim 18, further comprising:
controlling, with the flight vehicle control device, the unmanned flight vehicle by auto pilot so that the unmanned flight vehicle flies within the flight permitted airspace when it is determined that the position at which the unmanned flight vehicle is flying is not within the range of the flight permitted airspace.

20. The method according to claim 15, further comprising:
receiving, with the flight vehicle control device, the first control information via the wireless base station by using the identification information, the first control information comprising an instruction to control flight of the unmanned flight vehicle, and
controlling, with the flight vehicle control device, flight of the unmanned flight vehicle based on the first control information.

21. The method according to claim 20, further comprising:
controlling, with the flight vehicle control device, the unmanned flight vehicle executing an autonomous control mode for controlling the flight state of the unmanned flight vehicle based on second control information stored in the memory, the second control information including a program for the unmanned flight vehicle to fly by auto pilot.

22. The method according to claim 15, wherein the identification information comprises an identification number of a communication provider providing the communication service or an identification number assigned to the user from the communication provider.

23. The method according to claim 15, wherein the identification information comprises information related to an international mobile subscriber identity (IMSI).

24. The method according to claim 15, further comprising:
receiving, with the flight vehicle control device, the airspace information via the wireless base station.

25. The method according to claim 15, further comprising:
controlling, with the flight vehicle control device, the unmanned flight vehicle based on a quality of a radio wave that the unmanned flight vehicle has received from the wireless base station.

26. The method according to claim 15, further comprising: controlling, with the flight vehicle control device, the unmanned flight vehicle to transmit a response comprising the base station identifier.

* * * * *